(12) United States Patent
Noh et al.

(10) Patent No.: US 11,689,403 B2
(45) Date of Patent: *Jun. 27, 2023

(54) METHOD, DEVICE, AND SYSTEM FOR TRANSMITTING OR RECEIVING UPLINK CONTROL CHANNEL IN WIRELESS COMMUNICATION SYSTEM

(71) Applicant: WILUS INSTITUTE OF STANDARDS AND TECHNOLOGY INC., Gyeonggi-do (KR)

(72) Inventors: Minseok Noh, Seoul (KR); Jinsam Kwak, Gyeonggi-do (KR); Kyungjun Choi, Seoul (KR); Hyukmin Son, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,490

(22) Filed: Dec. 11, 2021

(65) Prior Publication Data

US 2022/0103411 A1 Mar. 31, 2022

Related U.S. Application Data

(63) Continuation of application No. 16/784,767, filed on Feb. 7, 2020, now Pat. No. 11,240,081, which is a
(Continued)

(30) Foreign Application Priority Data

Aug. 11, 2017 (KR) .......................... 10-2017-0102653
Sep. 11, 2017 (KR) .......................... 10-2017-0116220
Sep. 12, 2017 (KR) .......................... 10-2017-0116433

(51) Int. Cl.
*H04L 27/26* (2006.01)
*H04B 7/08* (2006.01)
(Continued)

(52) U.S. Cl.
CPC ....... *H04L 27/2607* (2013.01); *H04B 7/0888* (2013.01); *H04L 1/1819* (2013.01);
(Continued)

(58) Field of Classification Search
CPC . H04L 27/2607; H04L 1/1819; H04L 5/0055; H04L 5/10; H04L 5/0051;
(Continued)

(56) References Cited

U.S. PATENT DOCUMENTS 9,357,538 B2    5/2016   Nam et al.
2014/0301324 A1 10/2014  Cheng et al.
(Continued)

FOREIGN PATENT DOCUMENTS

CN    103178926    6/2013
CN    103326767    9/2013
(Continued)

OTHER PUBLICATIONS

Office Action dated Dec. 21, 2021 for Chinese Patent Application No. 201880052102.4 and its English translation provided by the Applicant's foreign counsel.
(Continued)

*Primary Examiner* — Candal Elpenord
(74) *Attorney, Agent, or Firm* — Ladas & Parry, LLP

(57) ABSTRACT

A UE in a wireless communication system is disclosed. The UE includes a communication module and a processor for controlling the communication module. The processor determines a first cyclic shift (CS) value based on hybrid automatic repeat request acknowledgment (HARQ-ACK) information representing a response to a downlink channel
(Continued)

having been received from a base station, determines a CS offset based on request information representing a request to be transmitted from the UE to the base station, determines a second CS value representing a degree of cyclic-shifting a base sequence to be used in a physical uplink control channel (PUCCH) based on the first CS value and the CS offset, and transmits the PUCCH for simultaneous transmission of the request information and the HARQ-ACK information using a sequence generated by cyclic-shifting the base sequence based on the second CS value.

17 Claims, 21 Drawing Sheets

Related U.S. Application Data continuation of application No. PCT/KR2018/009297, filed on Aug. 13, 2018.

(51) Int. Cl.
| | |
|---|---|
| *H04L 1/18* | (2023.01) |
| *H04L 5/00* | (2006.01) |
| *H04L 5/10* | (2006.01) |
| *H04W 72/04* | (2023.01) |
| *H04W 72/12* | (2023.01) |
| *H04L 1/1812* | (2023.01) |
| *H04W 72/1268* | (2023.01) |
| *H04W 72/21* | (2023.01) |

(52) U.S. Cl.
CPC .......... *H04L 5/0051* (2013.01); *H04L 5/0055* (2013.01); *H04L 5/10* (2013.01); *H04W 72/1268* (2013.01); *H04W 72/21* (2023.01)

(58) Field of Classification Search
CPC ............ H04B 7/0888; H04W 72/1268; H04W 72/0413; H04W 72/04; H04W 72/02; H04W 80/02; H04W 72/21
USPC ................................................ 370/329–330
See application file for complete search history.

(56) References Cited

U.S. PATENT DOCUMENTS

| | | | |
|---|---|---|---|
| 2019/0140876 | A1 | 5/2019 | Yoshimura et al. |
| 2020/0067680 | A1 | 2/2020 | Nayeb Nazar et al. |
| 2020/0092876 | A1* | 3/2020 | Cho .................. H04W 72/0413 |
| 2020/0177424 | A1 | 6/2020 | Noh et al. |
| 2020/0178242 | A1 | 6/2020 | Yamamoto et al. |
| 2020/0413428 | A1 | 12/2020 | Liu et al. |

FOREIGN PATENT DOCUMENTS

| | | |
|---|---|---|
| EP | 2 445 279 | 4/2012 |
| WO | 2016/068542 | 5/2016 |
| WO | 2017/047875 | 3/2017 |

OTHER PUBLICATIONS

LG Electronics: "Design of short NR-PUCCH for up to 2 UCI bits", 3GPP TSG WG1 NR Ad-Hoc#2, R1-1710313, Qingdao, P.R. China, Jun. 27-30, 2017, pp. 1-10.
Office Action dated May 11, 2022 for Korean Patent Application No. 10-2022-7002237 and its English translation provided by the Applicant's foreign counsel.
NTT Docomo, Inc.: "Work plan for Rel-15 NR WI", 3GPP TSG RAN WG1 Meeting #90, R1-1713892, Prague, Czech Republic, Aug. 21-25, 2017, pp. 1-103.
MediaTek: "Offline Discussion Summary on Beam Recovery", 3GPP TSG RAN NR WG1 Ah-hoc, Meeting, R1-1711897, Qingdao, P.R. China, Jun. 27-30, 2017, pp. 1-17.
International Search Report for PCT/KR2018/009297 dated Dec. 6, 2018 and its English translation from WIPO (now published as WO2019/031954).
Written Opinion of the International Searching Authority for PCT/KR2018/009297 dated Dec. 6, 2018 and its English translation by Google Translate (now published as WO2019/031954).
Intel Corporation, "Short PUCCH formats for 1~2 UCI bits", R1-1707387, 3GPP TSG RAN WG1 Meeting #89, Hangzhou, China, May 7, 2017 (see sections 1-4).
Nokia et al. "Multiplexing between SR and Other UCI on Short PUCCH", R1-1708511, 3GPP TSG RAN WG1 Meeting #89. Hangzhou, China, May 6, 2017 (see sections 1-2).
ZTE, "NR Short PUCCH Structure for Up to 2 Bit UCI". R1-1707168, 3GPP TSG RAN WG1 Meeting#89, Hangzhou, China, May 6, 2017 (see pp. 1-8).
Mediatek Inc., "Discussion on Beam Recovery Mechanism", R1-1707832, 3GPP TSG RAN WG1 Meeting #89, Hangzhou, China, May 7, 2017 (see sections 1-4).
Office Action dated Jan. 28, 2021 for Korean Patent Application No. 10-2020-7003237 and its English translation provided by the Applicant's foreign counsel.
NTT Docomo, Inc. R1-1711098, "Sequence-based PUCCH for UCI of up to 2 bits", 3GPP TSG RAN WG1 NR ad-Hoc #2, Qingdao, P.R. China, Jun. 27-30, 2017, pp. 1-14.
Samsung, R1-1710655, "Beam Failure Recovery", 3GPP TSG RAN WG1 NR Ad-hoc #2, Qingdao, P.R. China, Jun. 27-30, 2017, pp. 1-7.
Office Action dated Jul. 26, 2021 for Indian Patent Application No. 202027007035.
Supplemental Notice of Allowance dated Oct. 15, 2021 for U.S. Appl. No. 16/784,767 (now published as U.S. 2020/0177424).
Notice of Allowance dated Sep. 9, 2021 for U.S. Appl. No. 16/784,767 (now published as U.S. 2020/0177424).
Non-Final Office Action dated Apr. 28, 2021 for U.S. Appl. No. 16/784,767 (now published as U.S. 2020/0177424).
Office Action dated Nov. 3, 2022 for Korean Patent Application No. 10-2022-7002237 and its English translation provided by the Applicant's foreign counsel.
Notice of Allowance dated Feb. 24, 2023 for Korean Patent Application No. 10-2022-7002237 and its English translation provided by the Applicant's foreign counsel.
ZTE: "Discussion on mechamsm to recovery from beam failure", 3GPP TSG RAN WG1 Meeting #90, R1-1712300, Prague, Czechia, Aug. 21-25, 2017, pp. 1-9.
MediaTek Inc.: "Discussion on Beam Recovery Mechanism", 3GPP TSG RAN WG1 Meeting #90, R1-1713697, Prague, Czechia, Aug. 21-25, 2017, pp. 1-6.

\* cited by examiner

METHOD, DEVICE, AND SYSTEM FOR TRANSMITTING OR RECEIVING UPLINK CONTROL CHANNEL IN WIRELESS COMMUNICATION SYSTEM

CROSS-REFERENCE TO RELATED APPLICATIONS

This application is a continuation of U.S. patent application Ser. No. 16/784,767 filed on Feb. 7, 2020, which is a continuation of International Patent Application No. PCT/KR2018/009297 filed on Aug. 13, 2018, which claims the priority to Korean Patent Application No. 10-2017-0102653 filed in the Korean Intellectual Property Office on Aug. 11, 2017, Korean Patent Application No. 10-2017-0116220 filed in the Korean Intellectual Property Office on Sep. 11, 2017, and Korean Patent Application No. 10-2017-0116433 filed in the Korean Intellectual Property Office on Sep. 12, 2017, the entire contents of which are incorporated herein by reference.

TECHNICAL FIELD

The present disclosure relates to a wireless communication system. More particularly, the present disclosure relates to a wireless communication method, device, and system for transmitting or receiving an uplink control channel.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE

Technical Problem

An object of the present disclosure provides a method and device for efficiently transmitting a signal in a wireless communication system, in particular, a cellular wireless communication system. An object of the present disclosure also provides a method for transmitting or receiving an uplink control channel, a device and a system therefor.

An object of the present disclosure also provides a method for simultaneously transmitting HARQ-ACK information and uplink control information other than the HARQ-ACK information.

An object of the present disclosure also provides a method for allocating a resource for transmitting an uplink control channel when simultaneously transmitting an uplink control channel and an uplink shared channel.

An object of the present disclosure also provides a method for mapping the uplink control information on the resources allocated for the uplink shared channel when transmitting the uplink control information on the resource on which the uplink shared channel is transmitted.

Technical Solution

According to an exemplary embodiment of the present disclosure, a User Equipment (UE) in a wireless communication system may include a communication module and a processor for controlling an operation of the communication module. The processor may be configured to determine a first cyclic shift (CS) value based on hybrid automatic repeat request acknowledgment (HARQ-ACK) information representing a response to a downlink channel having been received from a base station, determine a CS offset based on request information representing a request to be transmitted from the UE to the base station, determine a second CS value representing a degree of cyclic-shifting a base sequence to be used in a physical uplink control channel (PUCCH) based on the first CS value and the CS offset, and transmit the PUCCH for simultaneous transmission of the request information and the HARQ-ACK information using a sequence generated by cyclic-shifting the base sequence based on the second CS value.

The request information may include a scheduling request (SR) representing whether to request for uplink wireless resource allocation. Here, the processor may be configured to determine the CS offset based on whether the SR is a positive SR for requesting for scheduling.

The second CS value may be any one among a plurality of CS values determined according to the CS offset and a number of bits representing the HARQ-ACK information. Here, the plurality of CS values may be configured with CS values that are different from each other and increase by an identical interval based on a smallest CS value among the plurality of CS values. In addition, a size of the interval may be constant regardless of whether the SR is the positive SR.

The base sequence may be cyclic-shifted with N different CS values, the HARQ-ACK information may include m bits, and a size of the interval may be $N/(2^m)$. In addition, m may be 2, and N may be 12.

When the SR is a positive SR, the CS offset may be 1, and when the SR is not the positive SR, the CS offset may be 0.

When the SR is not the positive SR, the second CS value may be one among 0, 3, 6, and 9.

When the SR is the positive SR, the second CS value may be one among 1, 4, 7, and 10.

A transmission resource of a PUCCH format used for transmission of the PUCCH may be one resource block representing 12 subcarriers in a frequency domain. Here, the processor may be configured to transmit the PUCCH using the PUCCH format.

The transmission resource of the PUCCH format may be one or two symbols in a time domain.

The request information may include a beam recovery request (BR) representing whether to request for recovery for a beam failure. Here, the processor may be configured to transmit the PUCCH through a first PUCCH resource configured so that the SR and the HARQ-ACK information are transmitted, when the BR is not a positive BR for requesting for information about the beam, and transmit the PUCCH through a second PUCCH resource configured so that the BR other than the first PUCCH resource is transmitted when the BR is the positive BR.

The processor may be configured to acquire an initial cyclic shift value. In addition the processor may be configured to calculate a phase value by which the base sequence is cyclic-shifted based on the initial CS value and the second CS value, and generate the sequence by cyclic-shifting the base sequence by the phase value.

According to another exemplary embodiment of the present disclosure, a method of operating a User Equipment (UE) in a wireless communication system may include: determining a first cyclic shift (CS) value based on hybrid automatic repeat request acknowledgment (HARQ-ACK) information representing a response to a downlink channel having been received from a base station; determining a CS offset based on request information representing a request to be transmitted from the UE to the base station; determining a second CS value representing a degree of cyclic-shifting a base sequence to be used in a physical uplink control channel (PUCCH) based on the first CS value and the CS offset; and transmitting the PUCCH for simultaneous transmission of the request information and the HARQ-ACK information using a sequence generated by cyclic-shifting the base sequence based on the second CS value.

The request information may include a scheduling request (SR) representing whether to request for uplink wireless resource allocation. In addition, the determining the CS offset may include determining the CS offset based on whether the SR is a positive SR for requesting for scheduling.

The second CS value may be any one among a plurality of CS values determined according to the CS offset and a number of bits representing the HARQ-ACK information. In addition, the plurality of CS values may be configured with CS values that are different from each other and increase by an identical interval based on a smallest CS value among the plurality of CS values. Here, a size of the interval may be constant regardless of whether the SR is the positive SR.

The base sequence may be cyclic-shifted with N CS values which are different from each other, and the HARQ-ACK information may include m bits. Here, a size of the interval may be $N/(2^m)$.

When the SR is a positive SR, the CS offset may be 1, and when the SR is not the positive SR, the CS offset may be 0.

When the SR is not the positive SR, the second CS value may be one among 0, 3, 6, and 9.

When the SR is the positive SR, the second CS value may be one among 1, 4, 7, and 10.

The request information may include a beam recovery request (BR) representing whether to request for recovery for a beam failure. Here, the transmitting the PUCCH may include transmitting the PUCCH through a first PUCCH transmission resource configured so that the SR and the HARQ-ACK information are transmitted, when the BR is not a positive BR for requesting information about a beam, and transmitting the PUCCH through a second PUCCH resource configured so that the BR other than the first PUCCH resource is transmitted, when the BR is the positive BR.

Advantageous Effects

The present disclosure provides a method and device for efficiently transmitting a signal in a wireless communication system, in particular, a cellular wireless communication system. The present disclosure also provides a method for transmitting or receiving an uplink control channel, a device and a system therefor.

MODE FOR CARRYING OUT THE INVENTION

Figure 1:
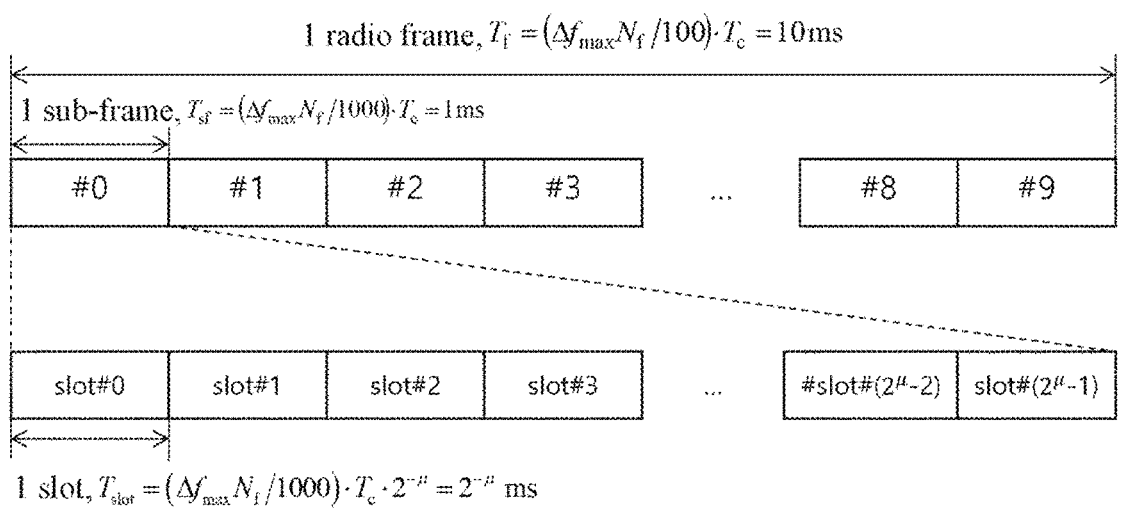
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE).

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f / 100)*T_c$). In addition, the wireless frame includes 10 subframes (SFs) having equal sizes. Herein, $\Delta f_{max} = 480*10^3$ Hz, $N_f = 4096$, $T_c = 1/(\Delta f_{ref}*N_{f,\ ref})$, $\Delta f_{ref} = 15*10^3$ Hz, and $N_{f,\ ref} = 2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one subframe. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
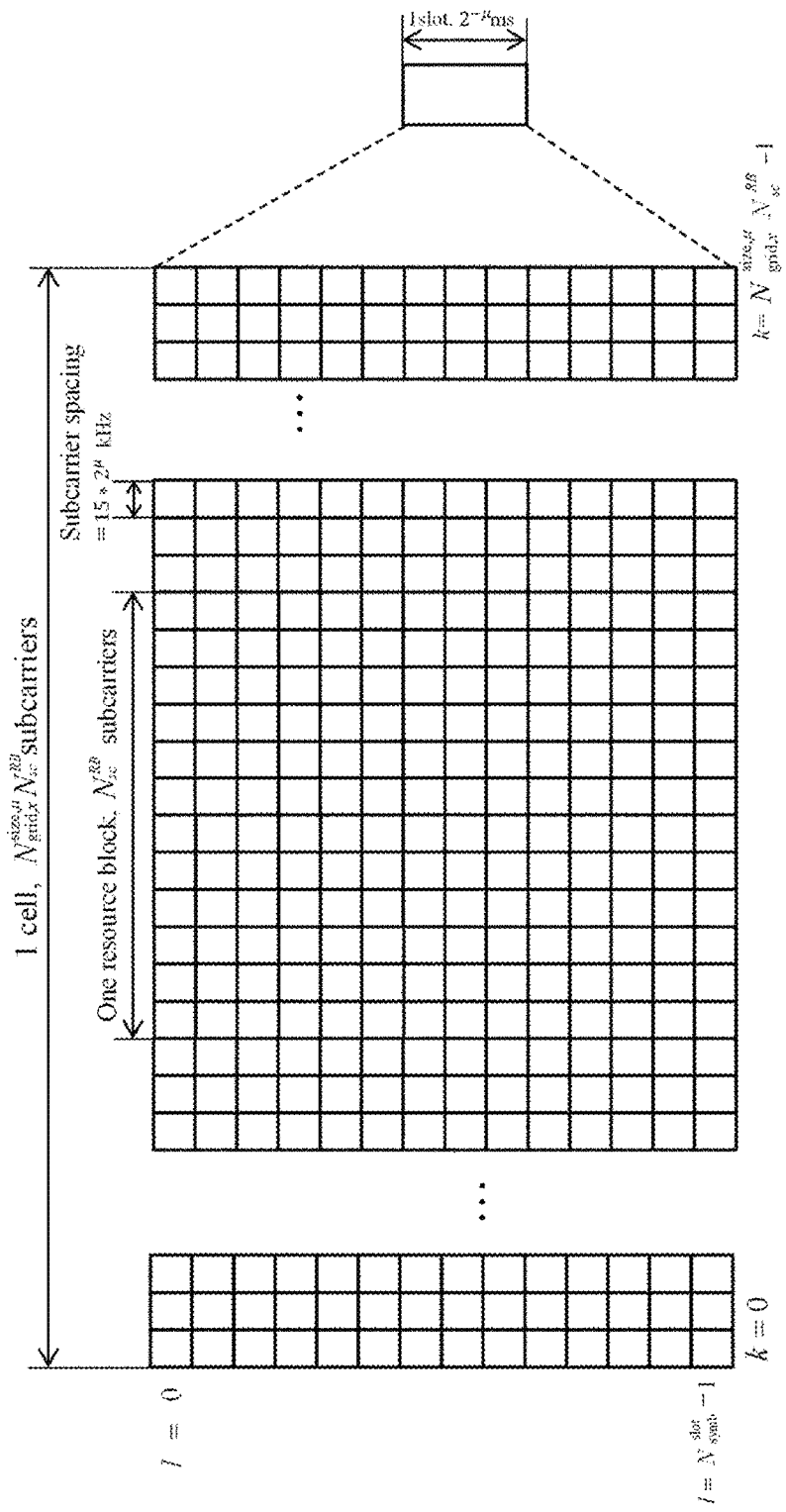
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to as simply as symbols. One RB includes 12 consecutive subcarriers in the frequency domain. Referring to FIG. 2, a signal transmitted from each slot may be represented by a resource grid including $N^{size,\ \mu}_{grid,\ x}*N^{RB}_{sc}$ subcarriers, and $N^{slot}_{symb}$ OFDM symbols. Here, x=DL when the signal is a DL signal, and x=UL when the signal is an UL signal. $N^{size,\ \mu}_{grid,\ x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\ \mu}_{grid,\ x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\ \mu}_{grid,\ x}*N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated by a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | D |
| 44 | D | D | D | D | D | X | X | X | X | X | X | U | U | U |
| 45 | D | D | D | D | X | X | U | U | U | U | U | U | U | U |
| 46 | D | D | D | D | X | D | D | D | D | D | D | D | X | U |
| 47 | D | X | U | U | U | U | D | X | U | U | U | U | U | U |
| 48 | D | X | U | U | U | U | D | X | U | U | U | U | U | U |
| 49 | D | D | D | X | X | U | D | D | D | X | X | U | | |

TABLE 1-continued

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 50 | D | D | X | X | U | U | U | D | D | X | X | U | U | U |
| 51 | D | X | X | U | U | U | U | D | X | X | D | D | D | D |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56-255 | | | | | | | Reserved | | | | | | | |

In Table 1, D denotes a DL symbol, U denotes a UL symbol, and X denotes a flexible symbol. As shown in Table 1, up to two DL/UL switching in one slot may be allowed.

Figure 3:
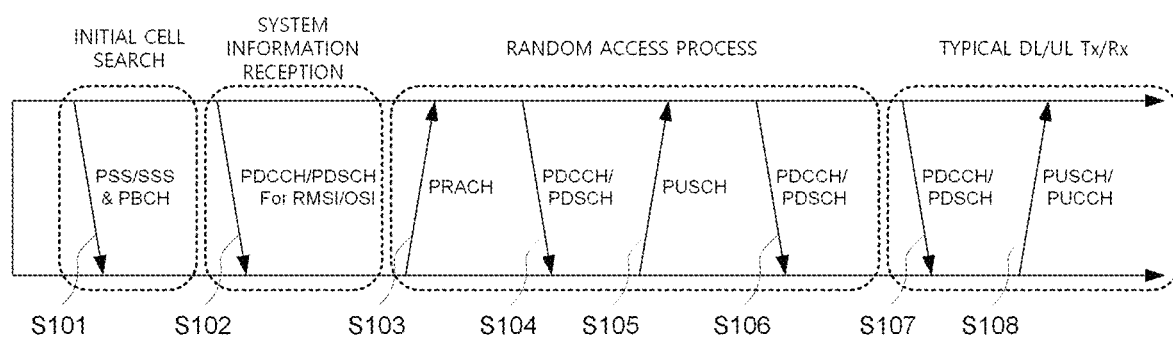
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102).

When the UE initially accesses the base station or does not have radio resources for signal transmission, the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
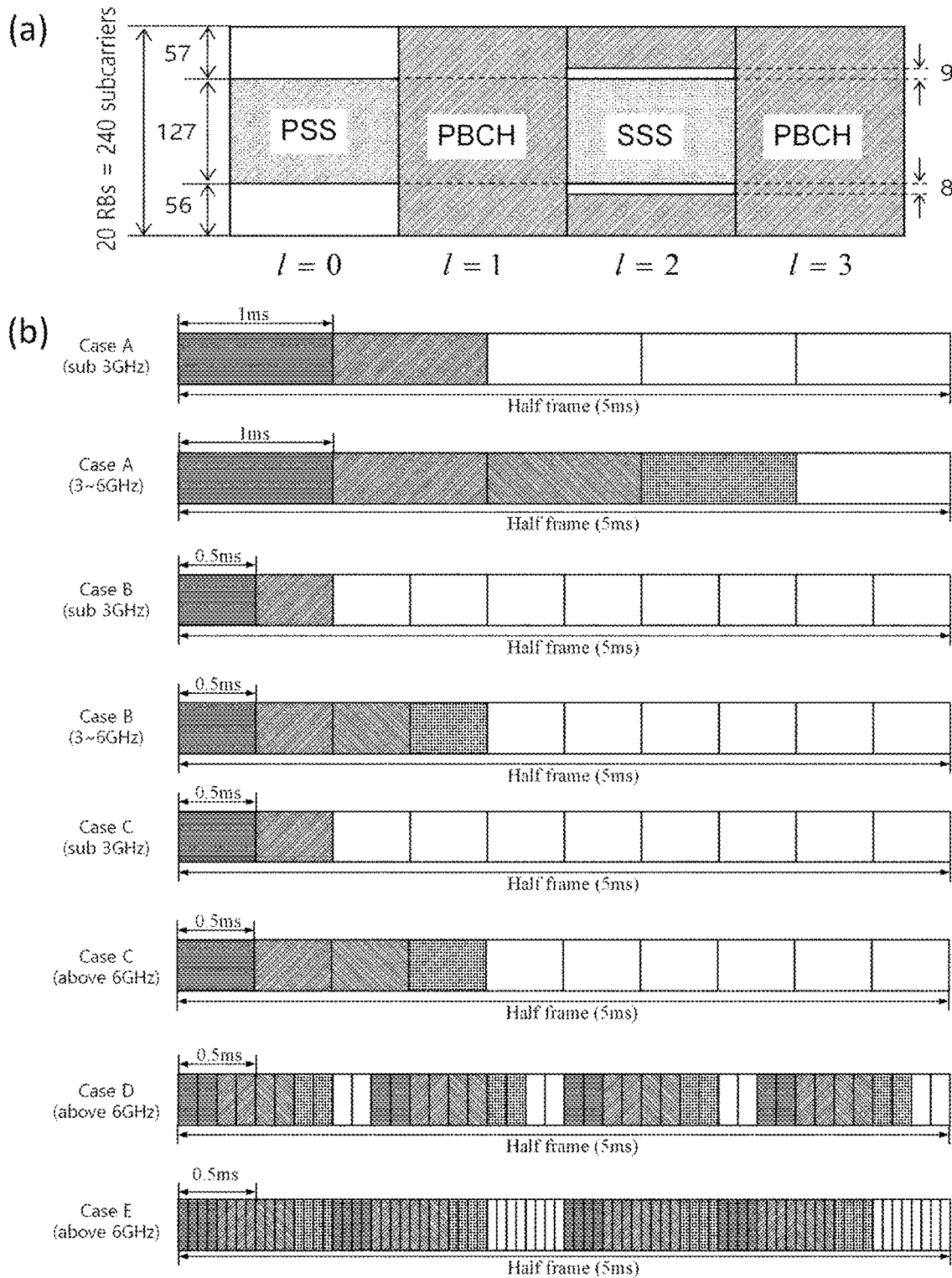
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs(=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/ relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID} = 3N^{(1)}_{ID} + N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$
$$m = (n + 43N^{(2)}_{ID}) \bmod 127$$
$$0 \le n < 127$$

Here, $x(i+7) = (x(i+4) + x(i)) \bmod 2$ and is given as $$[x(6) \ x(5) \ x(4) \ x(3) \ x(2) \ x(1) \ x(0)] = [1\ 1\ 1\ 0\ 1\ 1\ 0]$$

Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$
$$m_0 = 15\left\lfloor \frac{N^{(1)}_{ID}}{112} \right\rfloor + 5N^{(2)}_{ID}$$
$$m_1 = N^{(1)}_{ID} \bmod 112$$
$$0 \le n < 127$$

Here, $x_0(i+7) = (x_0(i+4) + x_0(i)) \bmod 2$
$x_1(i+7) = (x_1(i+1) + x_1(i)) \bmod 2$ and is given as $$[x_0(6) \ x_0(5) \ x_0(4) \ x_0(3) \ x_0(2) \ x_0(1) \ x_0(0)] = [0\ 0\ 0\ 0\ 0\ 0\ 1]$$
$$[x_1(6) \ x_1(5) \ x_1(4) \ x_1(3) \ x_1(2) \ x_1(1) \ x_1(0)] = [0\ 0\ 0\ 0\ 0\ 0\ 1]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
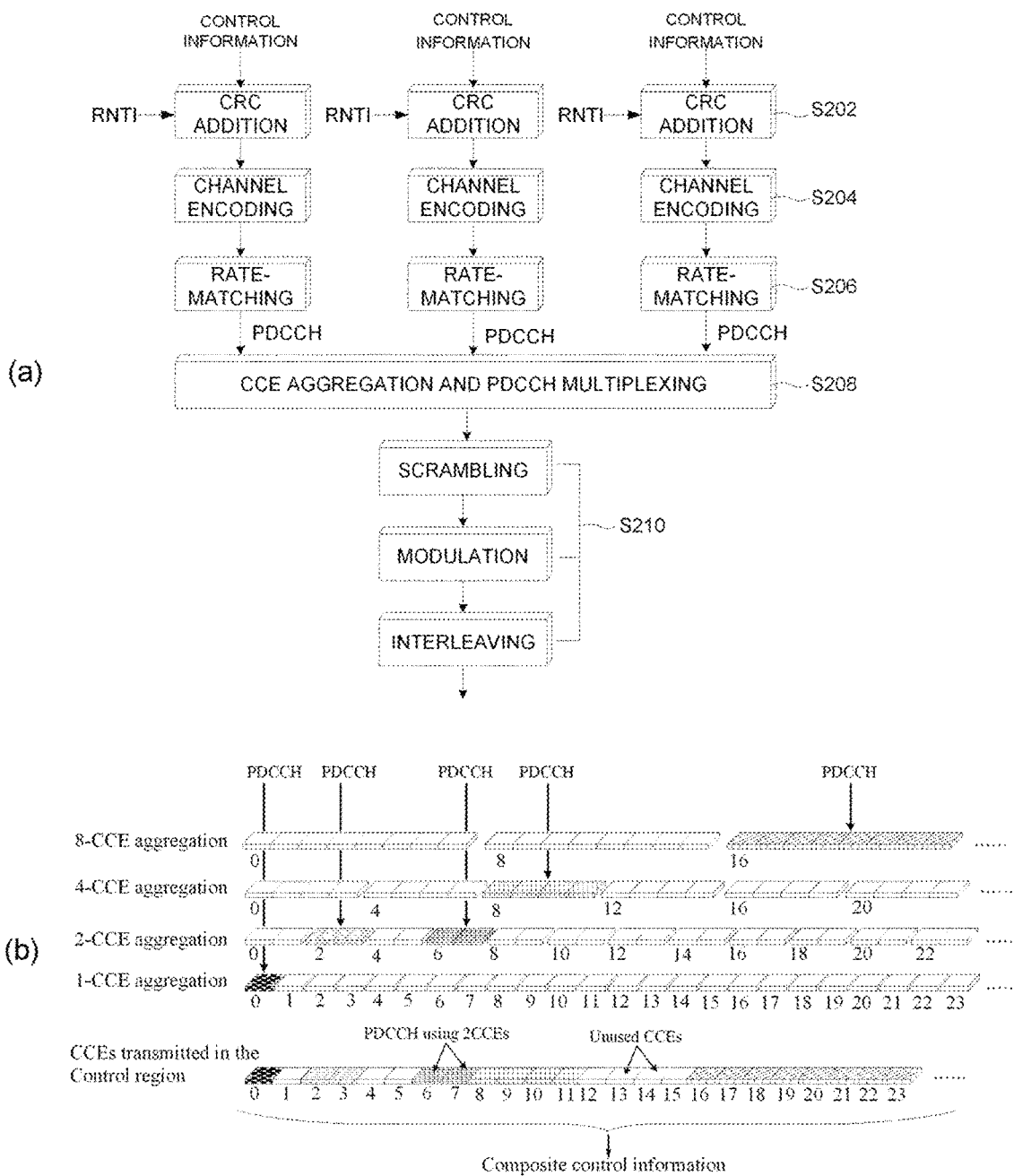
FIG. 5 illustrates a procedure for transmitting control information and a control channel in a 3GPP NR system.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
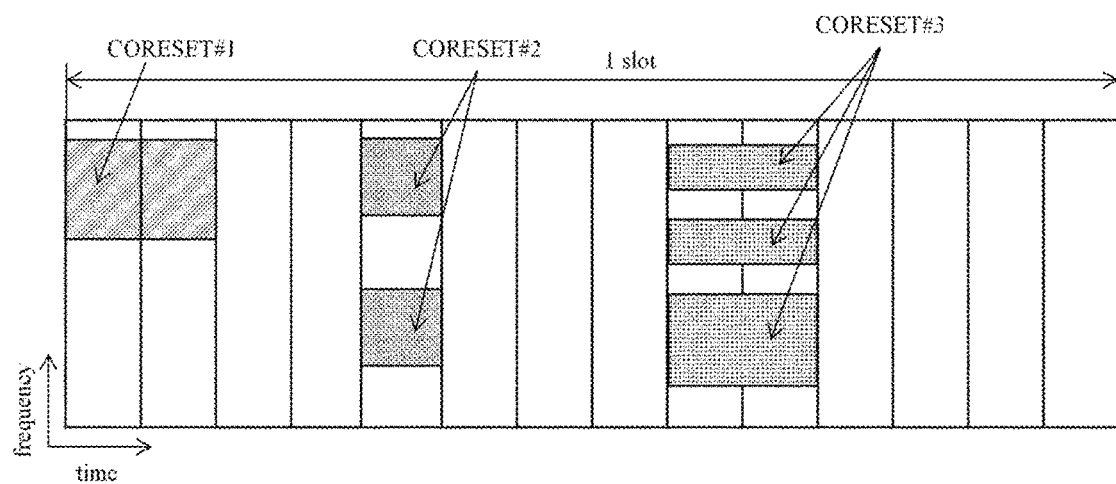
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
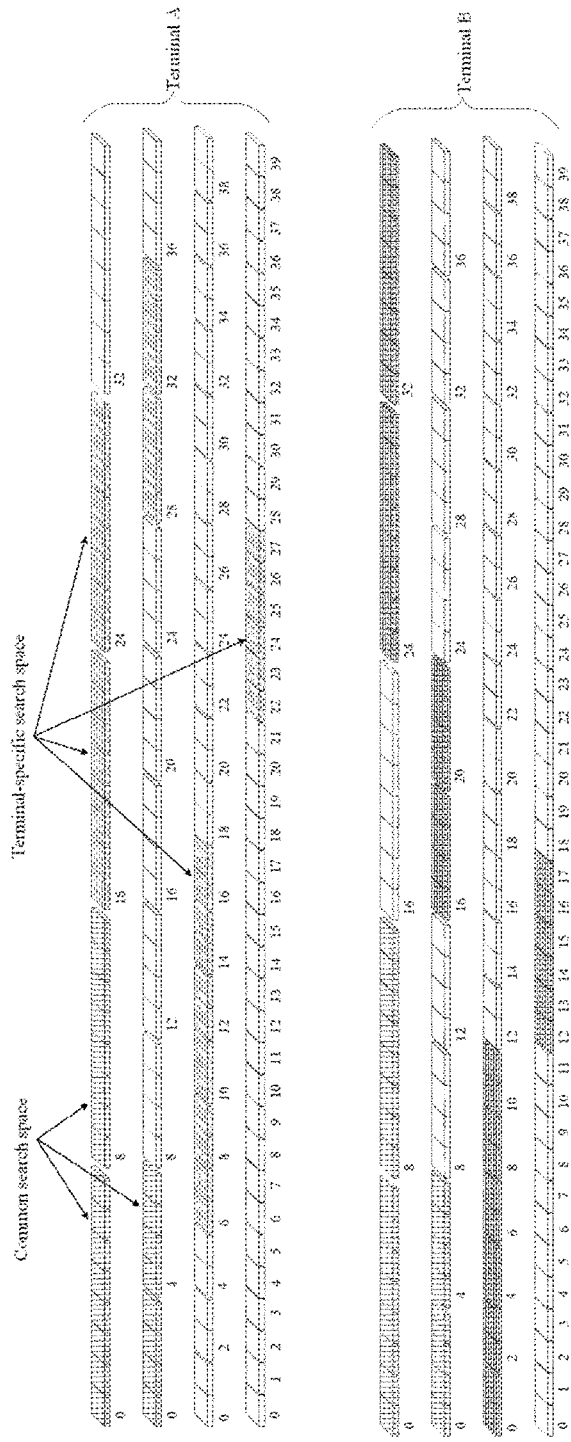
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |

TABLE 3-continued

| PUCCH format | Length in OFDM symbols | Number of bits |
|---|---|---|
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
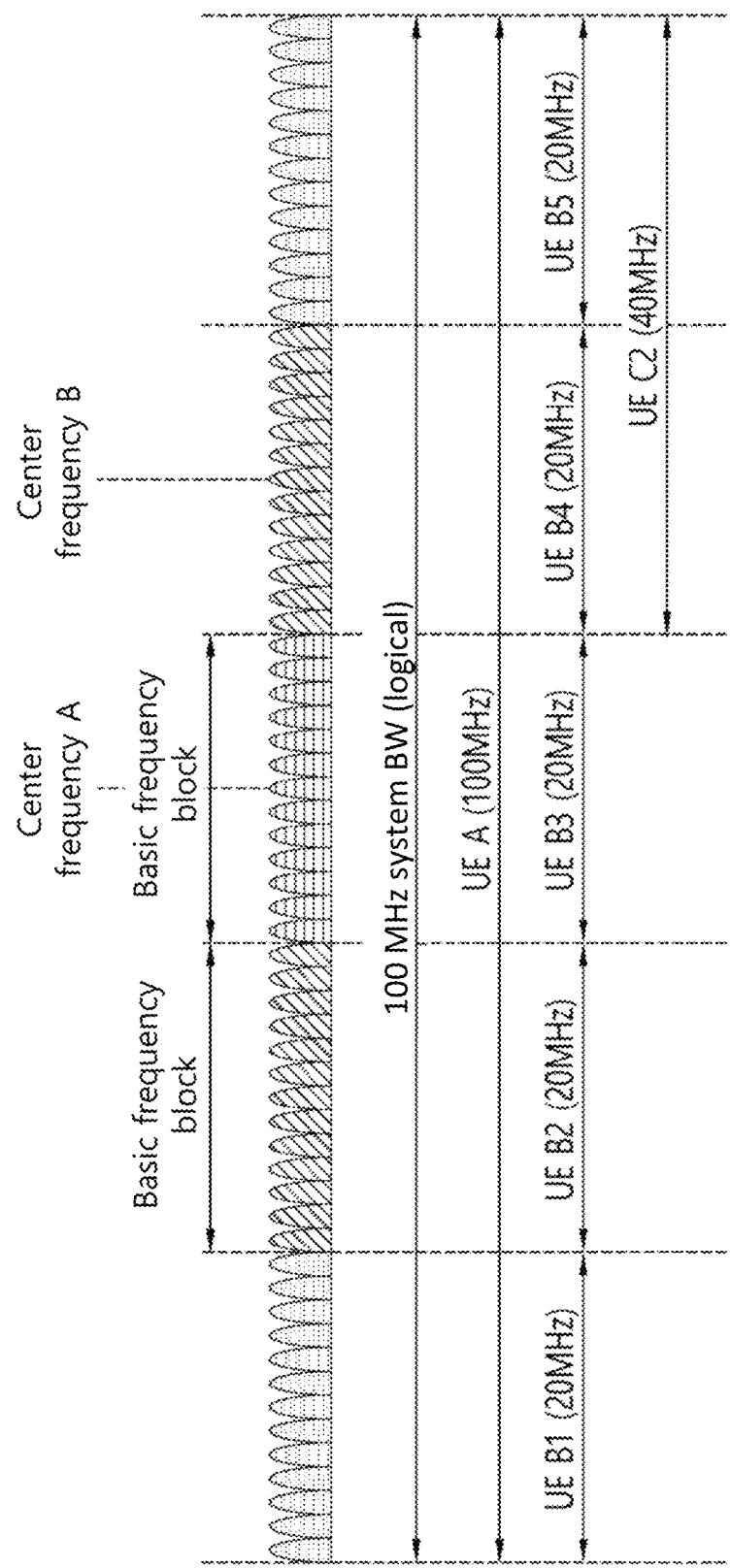
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
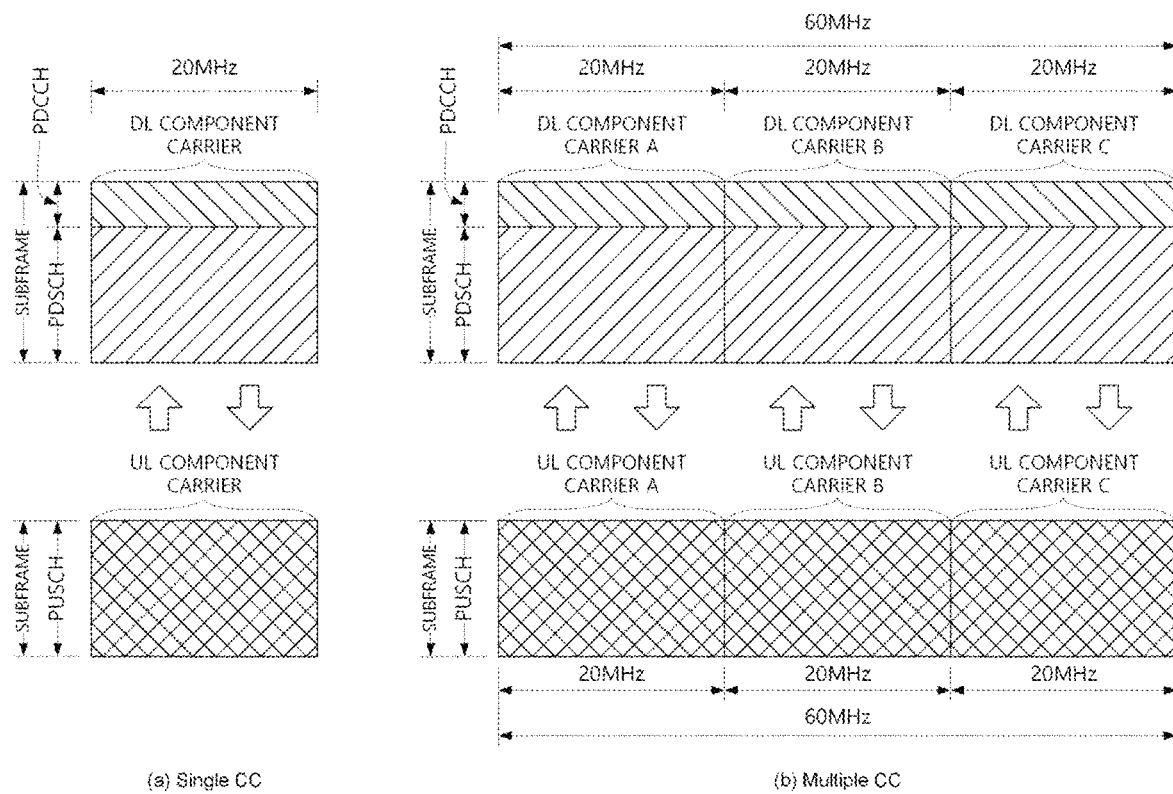
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
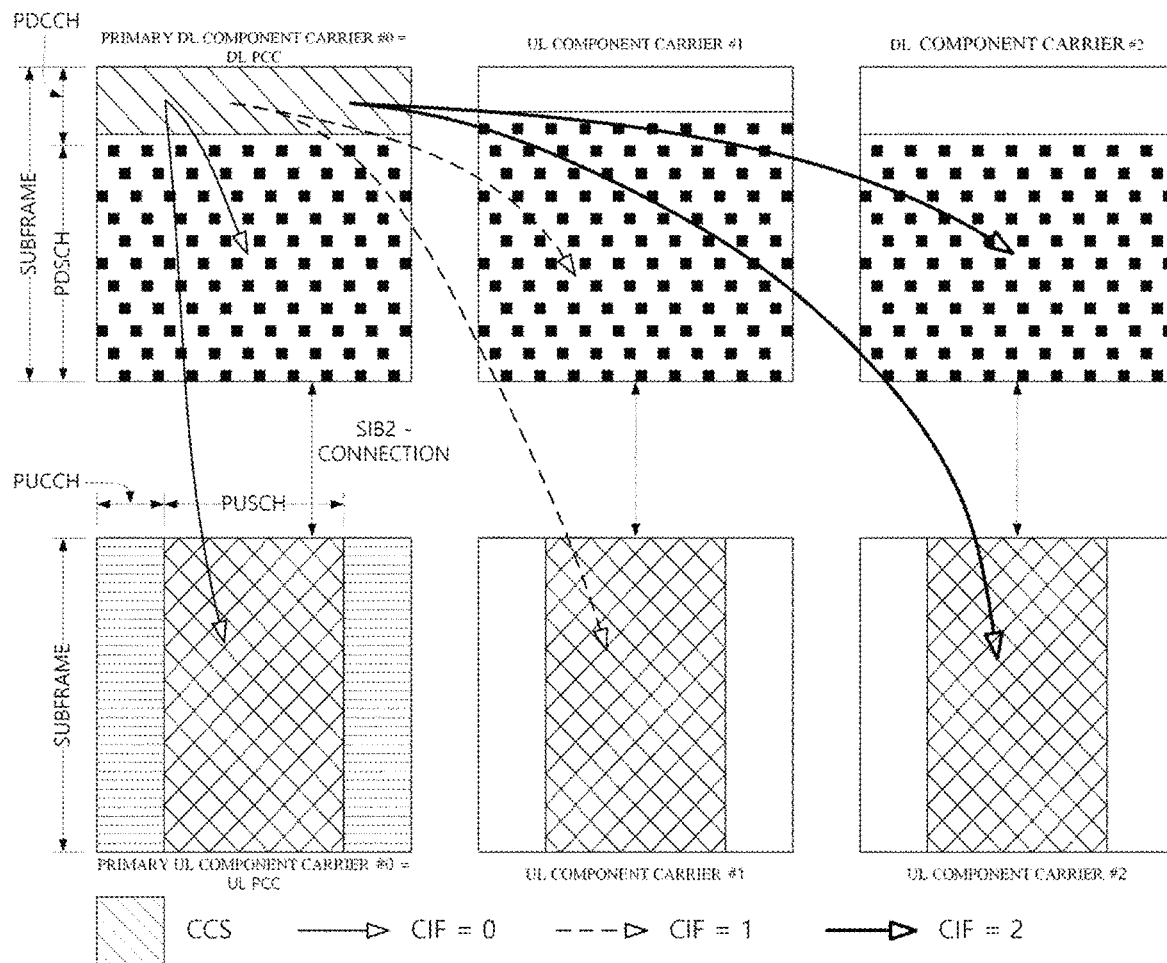
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
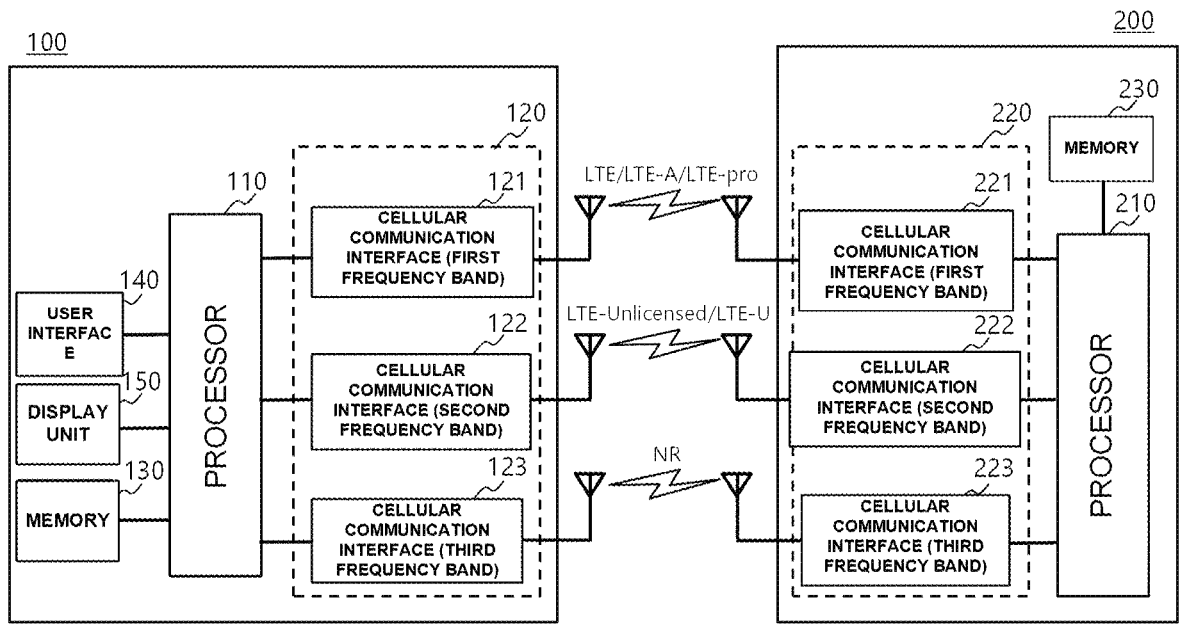
FIG. 11 is a block diagram showing the configurations of a UE and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

In an NR system, a PUCCH may be divided into a long PUCCH and a short PUCCH according a PUCCH format. Here, the symbol period of the long PUCCH may be longer than that of the short PUCCH. For example, the long PUCCH means a PUCCH format composed of 4 or more OFDM symbols. In addition, among the aforementioned PUCCH formats, PUCCH formats 1, 3, and 4 belong thereto. In addition, the short PUCCH means a PUCCH format composed of two or smaller OFDM symbols. Among the aforementioned PUCCH formats, PUCCH formats 0 and 2 belong thereto.

According to an embodiment, the short PUCCH may have one or two symbol periods. In addition, in the short PUCCH, a PUCCH format having 1 RB size (i.e. 12 REs) for each one symbol is referred to as PUCCH format 0. In addition, in the short PUCCH, a PUCCH format having one RB to 16 RBs for each one symbol is referred to as PUCCH format 2. For the short PUCCH having two symbol periods, transmission may be performed in different manners using different short PUCCH formats according to a bit size of UCI to be transmitted by the UE. For example, the UCI to be transmitted by the UE may be repeatedly transmitted at each symbol during the two symbol periods in which the short PUCCH is transmitted. Alternatively, different pieces of UCI may be respectively transmitted at the two symbol periods in which the short PUCCH is transmitted. In this case, it may be configured so that the UE transmits time-sensitive information in a second symbol period between the two symbol periods in which the short PUCCH is transmitted, and transmits non-time-sensitive information in a first symbol period between the two symbol periods. Through this, a processing time in the UE may be ensured for the time-sensitive information. Hereinafter, for convenience of description, the short PUCCH having one symbol will be basically described, but the present disclosure is not limited thereto. Embodiments pertaining to a short PUCCH to be described hereinafter may also be identically or correspondingly applied to the short PUCCH composed of two symbols. The configuration of a time resource and a frequency resource to which a PUCCH is allocated may vary according to a PUCCH format.

Figure 12:
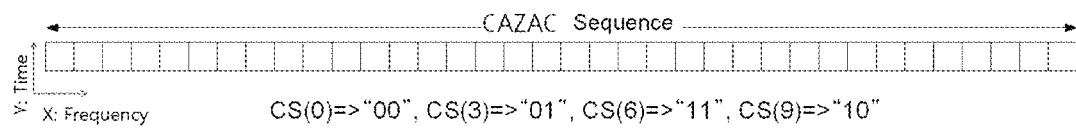
FIG. 12 illustrates an example of a sequence-based short PUCCH format according to an embodiment of the present disclosure.

FIG. 12 illustrates an example of a sequence-based short PUCCH format according to an embodiment of the present disclosure. Here, the sequence-base short PUCCH format may be a PUCCH format in which the aforementioned base sequence is cyclic shifted (CS) to transmit difference pieces of information. In an NR system, the sequence-based short PUCCH format may be the aforementioned PUCCH format 0 through Table 3. Hereinafter, unless described otherwise herein, the sequence indicates the base sequence itself or a sequence cyclic-shifted from the base sequence, which is used in the sequence-based short PUCCH format.

In FIG. 12, an x-axis denotes a plurality of subcarriers in a frequency domain, and a y-axis denotes a symbol in a time domain. For example, the sequence-based short PUCCH format may be allocated to a resource including a plurality of REs. In detail, the sequence-based short PUCCH format is composed of one or consecutive two symbols (time resource), and a resource composed of a plurality of consecutive subcarriers (frequency resource) may be allocated to each symbol. Here, the number of the plurality of consecutive subcarriers may be obtained by multiplying the number of RBs by the number of subcarriers for each RB. For example, the number of the plurality of consecutive subcarriers may be the number that one RB has. In addition, one RB may be 12 subcarriers. For the sequence-based short PUCCH format, a PUCCH resource may include 12 subcarriers for each symbol.

Figure 13:
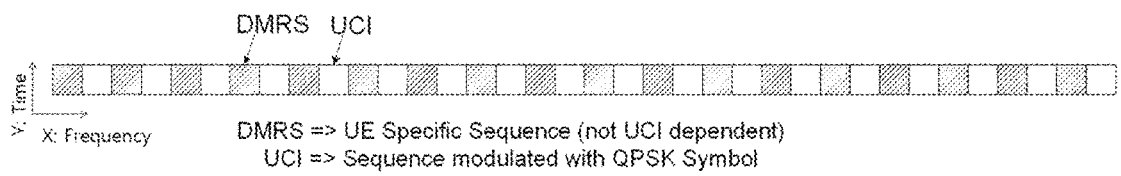
FIG. 13 illustrates an example of a frequency division multiplexing-based short PUCCH format in an NR system according to an embodiment of the present disclosure.

FIG. 13 illustrates an example of a frequency division multiplexing (FDM)-based short PUCCH format in an NR system according to an embodiment of the present disclosure. Here, the FDM-based short PUCCH format may be a PUCCH format which is distinguished by subcarriers of a reference signal (RS) and UCI. For example, in the NR system, the FDM-based short PUCCH format may be the aforementioned PUCCH format 2. Here, the plurality of subcarriers forming the FDM-based short PUCCH format may be mapped to each of the UCI and the RS according to a preset ratio. For example, the RS may be mapped to subcarriers corresponding to ½, ⅓, ¼, or ⅙ of the total number of subcarriers that form the PUCCH. FIG. 13 illustrates a FMD-based short PUCCH format, when an RS overhead, which represents a ratio of RS-occupied subcarriers over the entire subcarriers, is ½.

In FIG. 13, an x-axis denotes a plurality of subcarriers in a frequency domain, and a y-axis denotes a symbol in a time domain. In more detail, the FDM-based short PUCCH format is composed of one or two consecutive symbols (time resource), and a resource composed of a plurality of consecutive subcarriers (frequency resource) may be allocated to each symbol. Here, the number of the plurality of consecutive subcarriers may be obtained by multiplying the number of RBs by the number of subcarriers for each RB. For example, unlike the aforementioned sequence-based short PUCCH format, the FDM-based short PUCCH format may be composed of one or more RBs for each symbol. In more detail, for the FDM-based short PUCCH format, a PUCCH resource may include, for each symbol, from subcarriers that may be occupied by one RB to subcarriers that may be occupied by 16 RBs. According to an embodiment of the present disclosure, a UE may transmit the UCI using the aforementioned sequence-based short PUCCH format or the FDM-based short PUCCH format. According to an embodiment, the UE may transmit the UCI using another PUCCH format according to a payload size of the UCI to be transmitted. For example, when the payload size of the UCI to be transmitted by the UE is 2 or smaller, the UE may transmit the UCI using the sequence-based short PUCCH format. In addition, when the payload size of the UCI to be transmitted by the UE exceeds 2, the UE may transmit the UCI using the FDM-based short PUCCH format.

A type of the UCI to be transmitted through the PUCCH may include HARQ-ACK information, a SR, CSI, a beam failure recovery request (BR), or a combination thereof. The UCI payload may include at least one among bit(s) representing HARQ-ACK information, an SR bit, a CSI bit or a BR bit. The HARQ-ACK information may also include one or more bits. In addition, the UE may also transmit a plurality of pieces of UCI having different UCI types through one PUCCH. Hereinafter, description will be provided about a method in which a UE according to an embodiment of the present disclosure transmits HARQ-ACK information and UCI other than HARQ-ACK information through a short PUCCH format. For example, the UE may transmit request information for indicating a request to be transmitted to the base station and the HARQ-ACK information. Here, the request information may include at least one of the SR or BR. In the present disclosure, the request information may be used as terms indicating the at least one of the SR or BR.

According to an embodiment, when the UE transmits a scheduling request (SR), the UE may transmit the SR using an SR-PUCCH for the SR according to the configuration of the base station. The base station may set, to the UE, a resource for transmitting the SR using the PUCCH through an RRC signal. In other words, the base station may configure, to the UE, an SR-PUCCH resource for SR transmission. The UE may transmit the SR-PUCCH to the base station through the SR-PUCCH resource configured by the base station. When the UE requests the base station for the resource for transmitting a UL-SCH, the UE may transmit the SR using a PUCCH configured thereto. For example, the UE may transmit an SR composed of a single bit through the PUCCH configured based on an RRC signal. In more detail, when the UE requests a UL-SCH resource, the UE may transmit the SR, which is a positive SR, to the base station. The base station receiving the positive SR may schedule the UL-SCH resource to the UE that has transmitted the positive SR. Here, the SR may be signaled through at least one bit. For example, a bit value of the positive SR may be represented as 1 and a bit value of the negative SR may be represented as 0. In an embodiment to be described later, an SR for requesting to schedule the UL-SCH resource may be referred to as a positive SR. In addition, a negative SR may indicate an SR when the UE does not request the UL-SCH resource. In addition, when the UE does not request the UL-SCH resource, the UE may not transmit the PUCCH through a resource configured with resources for the SR transmission.

Meanwhile, the SR transmission by the UE may overlap HARQ-ACK information transmission for downlink data transmission by the base station on a time axis. For example, a time point at which the UE tries to request a UL-SCH resource may overlap, on a time axis, a time point when the UE tries to transmit the HARQ-ACK information. In this case, the UE may transmit the SR and the HARQ-ACK information simultaneously using the PUCCH. When the SR and the HARQ-ACK information are simultaneously transmitted using the PUCCH, the UE according to an embodiment of the present disclosure may efficiently transmit the SR and the HARQ-ACK information through a multiplexing or transmission mechanism.

For example, the base station may separately configure an SR-PUCCH resource for transmitting the SR and an HARQ-PUCCH resource for transmitting the HARQ-ACK information. Here, when the UE tires to simultaneously transmit a positive SR and the HARQ-ACK information, the UE may simultaneously transmit the positive SR and the HARQ-ACK information through the SR-PUCCH resource. On the contrary, when the UE tires to simultaneously transmit a negative SR and the HARQ-ACK information (or only the HARQ-ACK information), the UE may simultaneously transmit the negative SR and the HARQ-ACK information through the HARQ-PUCCH resource. Here, the UE may transmit up to 2-bit HARQ-ACK information using the sequence-based short PUCCH format of FIG. 12. The base station may detect the SR-PUCCH resource and the HARQ-PUCCH resource to acquire the HARQ-ACK information and information about whether the SR has received.

In addition, according to the configuration of the base station, the UE may perform transmission using any one between the sequence-based short PUCCH format and the FDM-based short PUCCH format based on a payload size of UCI to be transmitted. For example, the UE may transmit only the SR using the sequence-based short PUCCH format, or only 1 or 2-bit HARQ-ACK information. In addition, the UE may simultaneously transmit the SR and 2 or more bits of HARQ-ACK information using the FDM-based short PUCCH format. Meanwhile, a resource configured based on the sequence-bases short PUCCH format for the SR transmission by the UE may be multiplexed with SR transmission of another UE. Accordingly, when the UE transmits the SR by means of another resource without using a PUCCH resource for the SR transmission, SR detection performance of the base station for the SR transmission by another UE may be improved. In more detail, in a case where the UE transmits the SR on a resource using the FDM-based short PUCCH format, or transmits the SR on a resource for HARQ-ACK transmission, SR detection performance of the base station for the SR transmission by the other UE may be improved when the base station detects an SR resource configured to be multiplexed with the SR transmission of another UE. When the SR and the HARQ-ACK are simultaneously transmitted, the base station according to an embodiment of the present disclosure may configure the UE to set one PUCCH resource for transmission of the SR and HARQ-ACK/NACK. For example, in a slot or subframe set so that the SR is transmitted according to an SR configuration, one PUCCH resource may be configured for transmission of the SR and HARQ-ACK/NACK. In this case, the base station may detect one PUCCH resource to obtain the HARQ-ACK information and information about whether the SR has received.

For example, when the number of bits representing the HARQ-ACK information exceeds 2, the UE may transmit the SR and the HARQ-ACK information using the FDM-based short PUCCH format. In this case, according to the configuration by the base station, the UE may transmit the SR and the HARQ-ACK information through a PUCCH resource of the FDM-based short PUCCH format. In addition, the UCI to be transmitted by the UE may have a different type from the SR and HARQ-ACK information, and have three or more bits. Even in this case, the UE may transmit the UCI using the FDM-bases short PUCCH format. The base station may configure the number of bits of HARQ-ACK information to be transmitted by the UE in response to a PDSCH having been transmitted by the base station. In addition, the base station may detect a PUCCH having been transmitted from the UE and acquire the HARQ-ACK information and request information based on the set number of bits of the HARQ-ACK information.

Meanwhile, when the UE uses the sequence-based short PUCCH format, PAPR/CM (peak-to-average power ratio/cubic metric) performance may be improved in comparison to a case of using the FDM-based short PUCCH format. When the PAPR/CM performance is improved, a wireless communication coverage may be widened. In addition, when the UE uses the sequence-based short PUCCH format, link performance may also be improved in comparison to a case of using the FDM-based short PUCCH format. Accordingly, the present disclosure may extend a case where a UE transmits UCI using a sequence-based short PUCCH format. For example, when UCI to be transmitted by the UE includes an SR and 1 or 2-bit HARQ-ACK information, the UE may transmit the UCI through the sequence-based short PUCCH format. The base station may configure the UE to transmit the UCI through the sequence-based short PUCCH format.

According to an embodiment, when transmitting the UCI using the sequence-based short PUCCH format, the UE cyclic-shifts a base sequence based on the UCI to be transmitted by the UE itself. When using the sequence-based short PUCCH format using 1 RB, the UE maps a sequence cyclic-shifted from the base sequence to 12 REs to transmit the 12 REs. The UE may calculate a phase value indicating a phase difference between the base sequence and the cyclic-shifted sequence based on an initial cyclic shift value (hereinafter, 'CS initial value') and a cyclic shift value (hereinafter, 'CS value'). Here, the CS value may be a value obtained by quantizing a degree that the base sequence is cyclic-shifted. In addition, the UE may obtain a CS initial value through an upper layer. More specifically, the CS initial value may be set differently for each PUCCH format. Alternatively, the UE may also obtain the CS initial value from the base station according to the PUCCH format. In addition, the phase value a may be expressed as the following Equation (1). In Equation (1), I may denote a symbol index of a slot in which the PUCCH is transmitted. For example, I=0 denotes a first symbol of the slot in which the PUCCH is transmitted. In addition, I' denotes a symbol index in the slot. $n_{s,f}^\mu$ may denote a slot index in a subframe. In Equation (1), an operator 'x mod y' denotes a remainder of x divided by y, and π denotes the circular constant. $N^{RB}_{sc}$ may denote the number of subcarriers included in one RB. In addition, c(i) may denote a preset pseudo-random sequence in a wireless communication system. As described above, the UE may calculate the phase value a based on the CS initial value mo set according to the PUCCH format and the CS value $m_{cs}$ determined according to the UCI.

$$\alpha_l = \frac{2\pi}{N_{sc}^{RB}}((m_0 + m_{cs} + n_{cs}(n_{s,f}^\mu, l+l')) \bmod N_{sc}^{RB})$$ [Equation 1]

Here, $n_{cs}(n_{s,f}^\mu, l) = \sum_{m=0}^{7} 2^m c(14 \cdot 8 n_{s,f}^\mu + 8l + m)$ Here, the UE may determine the CS value based on UCI to be transmitted by the UE. In addition, the UE may obtain the CS initial value from the base station. According to an embodiment, the UE may determine the CS value for cyclic-shifting the base sequence based on the HARQ-ACK information and whether to transmit the SR. For example, the UE may determine the CS value based on the HARQ-ACK information and whether the SR is a positive SR indicating SR transmission. The UE may map respectively, to CS values which are different from each other, combinations of bits indicating whether the SR is the positive SR and HARQ-ACK bits representing the HARQ-ACK information. In addition, the UE may map respectively the aforementioned bit combinations to sequences shifted from the base sequence based on the CS values which are different from each other. For example, when the HRAQ-ACK information is 1 bit, the combination of the SR bits and the HARQ-ACK bit may be mapped respectively to 4 CS values. In addition, when the HRAQ-ACK information is 2 bits, the combination of the SR bits and the HARQ-ACK bits may be mapped respectively to 8 CS values.

For example, when the UE transmits only two-bit HARQ-ACK information, bit sets of '00, 01, 10, 11' may be mapped to 4 CS values which are different from each other and then transmitted. Here, as the interval between the CS values is longer, the detection performance of the base station may be increased. This is because the phase at which the base sequence is cyclic-shifted varies according to the interval between the CS values. The CS value and the phase value may have a linear relationship. More specifically, as an interval between any two among a plurality of CS values is longer, the difference in phase at which the base sequence is cyclic-shifted may become larger. In addition, as the difference in phase at which the base sequence is cyclic-shifted is larger, the performance for identifying information mapped to the corresponding CS value may become increased. Each bit set may be referred to as a state in the present disclosure. In addition, when the number of cyclic-shifted sequence identified in one symbol is N, the UE may transmit N different pieces of information. The UE may determine the number of CS values which are different from each other according to the number of HARQ-ACK bits. For example, when the number of the HARQ-ACK bits is m, the number of CS values which are different from each other may be $2^m$. In this case, the $2^m$ CS values which are different from each other respectively mapped to $2^m$ states may be composed of $2^m$ CS values increasing by an identical interval based on the smallest CS value among the $2^m$ CS values which are different from each other. Here, the UE may be set so that the identical interval is $N/(2^m)$. For example, when N is 12 and m is 2, the interval between any two closest among four CS values mapped to each state may be the constant for each state. In this case, the magnitude of the CS interval indicating the interval between any two closest among a plurality of CS values may be 3. In addition, four cyclic-shift values respectively corresponding to the states may be {0, 3, 6, 9}.

According to an embodiment, when the UE simultaneously transmits the SR and the HARQ-ACK information, the UE may maintain the magnitude of the interval between the CS values identically to a case of transmitting only the HARQ-ACK information. The UE may set the interval between any two closest among the CS values according to the HARQ-ACK information in case of transmitting the SR and the HARQ-ACK information simultaneously identically to the interval between any two closest among the CS values according to the HARQ-ACK information in case of transmitting only the HARQ-ACK information. For example, when the SR is not a positive SR, the four CS values respectively corresponding to states according to the HARQ-ACK information may be {0, 3, 6, 9}. In this case, the UE may set the four CS values according to the HARQ-ACK information when the SR is a positive SR to be {1, 4, 7, 10} or {2, 5, 8, 11}. Through this, the UE may maintain the detection performance for the HARQ-ACK information.

In more detail, the UE may determine a cyclic shift offset (hereinafter, 'CS offset') based on whether the SR is a positive SR. For example, when the SR is the positive SR, the CS offset may be '1'. In addition, when the SR is not the positive SR (namely, the SR is a negative SR), the CS offset may be '0'. In addition, the UE may calculate a first cyclic shift value (hereinafter, 'first CS value') calculated based on the HARQ-ACK information, and a second CS value indicating a final cyclic shift value based on the CS offset. Next, the UE may cyclic-shift the base sequence based on the second CS value to generate a cyclic-shifted sequence. Then, the UE may transmit a PUCCH for simultaneous transmission of the SR and the HARQ-ACK information based on the generated sequence.

A plurality of different first CS values may be '0, 3, 6, 9' according to two bit values '00, 01, 10, 11' indicating the HARQ-ACK information. In addition, when the CS offset is '0', the second CS values to be used for cyclic-shifting the base sequence may be '0, 3, 6, 9'. On the contrary, when the CS offset is '1', the second CS value to be used for cyclic-shifting the base sequence may be '1, 4, 7, 10' or '2, 5, 8, 11'. In this way, the magnitude of the interval between any two closest among a plurality of different CS values may be maintained as '3' according to the HARQ-ACK information.

According to an embodiment, when an SR and HARQ-ACK information are simultaneously transmitted, the UE may set the aforementioned N to a larger value in comparison to the case of transmitting only the HARQ-ACK information. For example, the UE may set N to 12 in case of transmitting only the HARQ-ACK information, and to 16 in case of simultaneously transmitting the SR and the HARQ-ACK information. When the HARQ-ACK information is two bits and the UE sets N to 16, the magnitude of the interval between any two closest among four CS values respectively corresponding to states may be 4. For example, four CS values respectively corresponding to the states according to the HARQ-ACK information may be {0, 4, 8, 12}. In addition, the UE may set a CS offset based on whether the SR is a positive SR. Here, when the SR is the positive SR, the UE may set the CS offset to '2', and when the SR is not the positive SR, may set the CS offset to '0'. The UE may set the four CS values to {0, 4, 8, 12} according to the HARQ-ACK information when the SR is not the positive SR. In addition, the UE may set the four CS values to {2, 6, 10, 14} according to the HARQ-ACK information when the SR is the positive SR. This is because the UE may set the interval between the cyclic shift values longer based on the set N.

According to another embodiment, when an SR and HARQ-ACK information are simultaneously transmitted, the UE may set N to 8. When the HARQ-ACK information is two bits, and the UE sets N to 8, the magnitude between any two closest among four CS values respectively corresponding to states may be 2. For example, the four CS values respectively corresponding to the states according to the HARQ-ACK information may be {0, 2, 4, 6}. In addition, the UE may set a CS offset based on whether the SR is a positive SR. In this case, when the SR is the positive SR, the UE may set the CS offset to '1', and when the SR is not the positive SR, set the CS offset to '0'. The UE may set the four CS values to {0, 2, 4, 6} according to the HARQ-ACK information when the SR is not the positive SR. In addition, the UE may set the four CS values to {1, 3, 5, 7} according to the HARQ-ACK information when the SR is the positive SR. This is because the UE may set the interval between the cyclic shift values longer based on the set N.

Hereinafter, descriptions will be provided to a method in which a UE according to an embodiment of the present disclosure transmits an SR through a PUCCH. Table 4 shows a method for configuring a PUCCH resource for transmitting an SR in a wireless communication system according to an embodiment. The PUCCH resource for transmitting the SR in the wireless communication system may be allocated through RRC signaling.

TABLE 4

```
SchedulingRequestConfig ::= CHOICE {
    release NULL,
    setup SEQUENCE {
        sr-PUCCH-ResourceIndex INTEGER (0. .2047),
        sr-ConfigIndex INTEGER (0. .157),
        dsr-TransMax ENUMERATED {n4, n8, n16, n32, n64, spare3, spare2, spare1}
    }
}
MAC-MainConfig ::= SEQUENCE {
    ...
    [[ sr-ProhibitTimer-r9 INTEGER (0. .7) OPTIONAL -- Need ON
    ]],
    ...
}
```

In Table 4, sr-PUCCH-ResourceIndex denotes a frequency domain transmission resource index for PUCCH transmission. In addition, sr-configIndex may denote a time domain transmission resource index for the PUCCH transmission. dsr-TransMax denotes the maximum number of times of SR transmission. When the SR is triggered in an LTE system, a UE may calculate an SR periodicity and an SR subframe offset based on sr-configIndex. Next, the UE may transmit the SR through a PUCCH resource corresponding to the calculated SR periodicity and SR subframe offset. Table 5 represents a method for calculating, by the UE, the SR periodicity and SR subframe offset based on sr-configIndex.

According to an embodiment, when an uplink resource is not configured from the base station, the UE may retransmit an SR based on an SR periodicity up to the maximum number of times of SR transmission, dsr-TransMax. Even after the UE transmits SRs corresponding to the maximum number of times of SR transmission, the uplink resource may not be configured. In this case, the UE may release a scheduling request for the uplink resource, and perform a random access procedure.

TABLE 5

| SR configuration Index $I_{SR}$ | SR periodicity (ms) $SR_{PERIODICITY}$ | SR Subframe offset $N_{OFFSET,SR}$ |
|---|---|---|
| 0-4 | 5 | $I_{SR}$ |
| 5-14 | 10 | $I_{SR} - 5$ |
| 15-34 | 20 | $I_{SR} - 15$ |
| 34-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

In addition, the UE may set an SR transmission prohibit timer using sr-ProhibitTimer-r9 of MAC-MainConfig of Table 4 in order to prevent unnecessary SR transmission. When the SR transmission prohibit timer is set, the UE may not transmit the SR until the SR transmission prohibit timer expires. For example, the value of sr-ProhibitTimer-r9 may be any one among 0 to 7. When the value of sr-ProhibitTimer-r9 is '2', the UE may not transmit the SR during double the time of an SR period. In addition, the value of sr-ProhibitTimer-r9 is '0' may indicate a case where there is not the SR transmission prevention timer.

Meanwhile, according to the aforementioned embodiment, the UE may transmit an SR together with HARQ-ACK information through one PUCCH resource. Through this, the base station may detect a one PUCCH resource to recognize the SR and the HARQ-ACK information from the UE. In a 3GPP NR system, the UE may use a short PUCCH format to transmit UCI represented with 3 bits or more. In this case, the short PUCCH format may be an FDM-based PUCCH format described through FIG. 13. In addition, the UE may use a short PUCCH format to transmit UCI represented with 2 bit or less. Here, the short PUCCH format may be a sequence-based short PUCCH format described through FIG. 12.

According to an embodiment, when HARQ-ACK information and an SR are multiplexed in a PUCCH, mapping may be performed to different sequences as in Tables 6 and 7. Tables 6 and 7 respectively show a mapping relationship between information and a sequence, when the HARQ-ACK information is expressed with 1 bit and 2 bits.

TABLE 6

| HARQ-ACK without simultaneous SR opportunity | | HARQ-ACK with simultaneos SR opportunity | | |
|---|---|---|---|---|
| Sequence #1 | Sequence #2 | Sequence #1 | Sequence #2 | Sequence #3 |
| ACK | NACK | ACK + negative SR | ACK + positive SR | NACK + positive SR |

TABLE 7

| 2-bit HARQ-ACK in slots without simultaneous SR opportunity | | | | 2-bit HARQ-ACK in slots with simultaneous SR opportunity | | | | |
| --- | --- | --- | --- | --- | --- | --- | --- | --- |
| Seq. #1 | Seq. 2 | Seq. #3 | Seq. #4 | Seq. #1 | Seq. 2 | Seq. #3 | Seq. #4 | Seq. #5 |
| ACK, ACK | ACK, NACK | NACK, NACK | NACK, NACK | ACK, ACK + negative SR | ACK, NACK + negative SR | NACK, ACK + negative SR | ACK, ACK + positive SR | positive SR + NACK, NACK positive SR + ACK, NACK positive SR + NACK, ACK |

The aforementioned embodiments exemplarily describe a case where the SR and the HARQ-ACK are simultaneously transmitted, but the aforementioned embodiments may also be identically or correspondingly applied to a case where a BR and HARQ-ACK information are simultaneously transmitted. In addition, when it is necessary to simultaneously transmit the SR, the BR, and the HARQ-ACK information, and the priority of the BR is higher than that of the SR, the aforementioned embodiments may be applied as in the case where the BR and the HARQ-ACK information are simultaneously transmitted. The priorities of the SR and the BR will be described more specifically through embodiments to be described later.

Meanwhile, in a wireless communication system using an mmWave band, it is necessary to secure a signal arrival distance through beamforming. For wireless communication through the mmWave band, the transmission coverage is limited by a large power loss caused by the attenuation of a radio wave. Accordingly, a base station and a UE in an NR system using the mmWave band may configure an optimal transmission and reception beam pair between the base station and the UE. For example, the base station and the UE may signal beam-related information for periodically matching the directions of the transmission and reception beams to set the optimal beam pair. The UE may report, to the base station, the beam-related information measured based on signals transmitted and received through beams. Here, the beam-related information may include at least one among the number of supported beams, the number of beam sweeping resources, beam resource locations, and a beam sweeping period. In addition, operations for the base station and UE configuring and maintaining the beam pair may be referred to as a beam management technique.

When a beam is used for transmitting and signaling a signal in a wireless communication system according to an embodiment of the present disclosure, the UE may sense beam failure. Here, the beam failure may represent performance reduction or a link loss in signal transmission and reception through beams. When sensing the beam failure, the UE may perform a beam failure recovery mechanism. For example, after sensing the beam failure, the UE may identify a new candidate beam based on a candidate beam reference signal received from the base station. In this case, the candidate beam reference signal may include a periodic CSI-RS for beam management. Alternatively, the UE may measure beam link quality through at least one among a periodic CSI-RS or an SS and SS/PBCH blocks of the candidate beam reference signal. Then, the UE may transmit a beam recovery request BR to the base station. Here, the BR for requesting beam recovery may be referred to as a positive BR. A case in which the UE does not transmit the BR in embodiments to the described later may be referred to as a negative BR. In addition, the UE may monitor a search space configured to the UE in order to receive a control channel transmitted from the base station. In addition, the UE may receive a response from the base station for a beam failure recovery request having been transmitted by the UE. In this case, a beam failure recovery mechanism may be executed by transmitting the beam coverage request through a non-contention based access procedure through a physical random access channel (non-contention based RA) or a PUCCH. According to an embodiment of the present disclosure, a BR format in the beam-related information may be transmitted using a short PUCCH. In this case, a BR may be transmitted simultaneously with at least one of the aforementioned SR and HARQ-ACK information. For example, the BR may be multiplexed with at least one of the SR or the HARQ-ACK information. Hereinafter, description will be provided more specifically about a method for a UE according to an embodiment of the present disclosure to transmit the BR and the SR with reference to Tables 8 to 12. In Tables 8 and 12, parameter names and parameter value based on a 3GPP LTE system are used for convenience of description, but the present disclosure is not limited thereto.

According to an embodiment of the present disclosure, a UE may configure one common PUCCH resource for transmitting an SR and a BR. A base station may configure one common PUCCH resource for transmission of the SR and BR by the UE. Table 8 shows a method for configuring a PUCCH resource for the SR and the BR according to an embodiment of the present disclosure. In Table 8, srbr-PUCCH-ResourceIndex denotes a frequency domain index of the PUCCH resource for the SR and the BR, and srbr-ConfigIndex denotes a time domain index of the PUCCH resource for the SR and the BR. In addition, dsr-TransMax denotes the maximum number of times of SR transmission, and br-TransMax denotes the maximum number times of BR transmission. Here, Values which are haven by dsr-TransMax and br-TransMax may be the same each other. In addition, the UE may set a BR timer (br-Timer) representing a time at which BR retransmission is possible.

Unlike a prohibit timer in an LTE SR, in an NR BR, the UE sets the br-Timer for restricting a valid operation time of a BR besides the maximum number of times of retransmission. The corresponding parameter may represent allowance of the BR retransmission by an offset indicated by the br-Timer based on a slot (or a subframe) at a reference time. As an embodiment, the reference time of the br-Timer is set to a slot (or a subframe) in which a first BR is transmitted, and when an offset value is a value of units of a slot (or a subframe), a BR transmittable time limit is generated according to an offset range in the example of Table 5. For example, when the br-Timer is 3, the UE may retransmit the BR from the first transmission BR slot (or subframe) to a third slot (or subframe). The corresponding br-Timer value is not limited to the offset, and may be modified in various types for representing time information. For example, when the br-Timer is set as an index and has a value from 1 to 4, a BR timer value corresponding to each index may be set. In addition, when corresponding information is transmitted to the UE through the RRC signal, the UE may operate a BR timer based on corresponding information. Both or one of the corresponding maximum transmission times and the BR timer may be used for the BR transmission. Table 8 shows that the maximum number of times of transmission for the BR and a BR timer parameter are included in messages which are different from each other, but the messages may be the same each other.

The UE may retransmit the BR from an index of a subframe (or slot) indicating a reference time to an index of a subframe (or slot) indicated by the BR timer. According to an embodiment, the reference time at which the BR timer operates may be a subframe (or slot) in which the BR is first transmitted. In addition, an offset time represented by the BR timer may be a value of units of a subframe (or slot). For example, when the BR timer indicates '3', the BR may be retransmitted up to a third frame (or slot) following the subframe (or slot) in which the BR is transmitted first. In this case, a method that the BR timer represents a time at which the BR retransmission is possible is not limited to the aforementioned method for representing an offset time.

according to the length of a sequence supported in a PUCCH format. In addition, the UE may generate different sequences using different base sequences identified through a root index. Alternatively, the UE may generate different sequences by cyclic-shifting one base sequence based on cyclic shift values. In addition, the UE may transmit the PUCCH for the SR and BR using a sequence determined based on cross-correlation or autocorrelation performance.

In addition, the UE may distinguishes states from each other by allocating sequences, which are cyclic-shifted from the same base sequence based on the different cyclic-shift values, to No Transmission, only SR transmission, only BR transmission, and transmission of both SR and BR. No Transmission may be defined as no signal transmitted without sequence allocation.

TABLE 9

| Seq. #1 | Seq. #2 | Seq. #3 |
| --- | --- | --- |
| SR only | BR only | SR + BR |

According to an embodiment, the UE may transmit a PUCCH for the SR and BR using a punctured sequence

TABLE 8

```
SchedulingBeamRecoveryRequestConfig ::= CHOICE {
    release NULL,
    setup SEQUENCE {
        srbr-PUCCH-ResourceIndex INTEGER (0. .2047),
        srbr-ConfigIndex INTEGER (0. .157),
        dsr-TransMax ENUMERATED {n4, n8, n16, n32, n64, spare3, spare2, spare1}
        br-TransMax ENUMERATED {n4, n8, n16, n32, n64, spare3, spare2, spare1}
    }
}
MAC-MainConfig ::= SEQUENCE {
    ...
    [[ sr-ProhibitTimer-r9 INTEGER (0. .7) OPTIONAL -- Need ON
       br-Timer INTEGER (0, . . . , 7) OPTIONAL -- Need ON
    ]],
    ...
}
```

When a common PUCCH resource is configured for transmitting the SR and BR, the base station may determine whether at least one of the SR and the BR is included therein through PUCCH detection from one PUCCH resource. In this case, the base station determines whether the PUCCH for the SR and BR includes the SR, the BR, or both the SR and BR based on the sequence. Table 9 shows a method in which the SR and the BR are multiplexed based on a sequence. The UE may determine a sequence to be used for transmission of the PUCCH for the SR and BR based on at least one of the SR and BR. As in Table 9, the UE may transmit the PUCCH for the SR and BR using different sequences according to the SR and BR. For example, when transmitting only the SR, the UE may transmit the PUCCH using Seq. #1. In addition, when transmitting only the BR, the UE may transmit the PUCCH using Seq. #2. In addition, when transmitting the SR and BR simultaneously, the UE may transmit the PUCCH using Seq. #3. In addition, when the SR or BR transmission is not necessary, (i.e. when both the SR and BR are not transmitted), the UE may not transmit the PUCCH through a PUCCH resource configured to transmit the SR and BR. Through this, the UE may transmit the SR and BR using three sequences which are different from each other.

In this case, the sequences may include at least one among 1-RB sequence, 2-RB sequence or a Zadoff-Chu sequence based on a puncturing pattern. In this case, the base station may determine whether the PUCCH for the SR and BR includes the SR, the BR, or the SR and BR based on the sequence. In more detail, the base station may identify information included in the PUCCH through energy detection according to the puncturing pattern. In this case, the UE may puncture one sequence differently according to whether the SR and BR are transmitted and transmit PUCCHs for the SR and BR. Table 10 shows a method in which the SR and BR are multiplexed based on the puncturing pattern. In more detail, when only the SR is transmitted, the UE may puncture REs according to a first puncturing pattern in a PUCCH resource in which the sequence is to be transmitted, and transmit the sequence. In addition, when only the BR is transmitted, the UE may puncture REs according to a second puncturing pattern in the PUCCH resource in which the sequence is to be transmitted, and transmit the PUCCH. In this case, the first puncturing pattern may be different from the second puncturing pattern. In addition, when the SR and BR are transmitted simultaneously, the UE may transmit a sequence not punctured.

TABLE 10

| Sequence with puncturing pattern 1 | Sequence with puncturing pattern 2 | Sequence with no puncturing |
|---|---|---|
| SR only | BR only | SR + BR |

Unlike Table 10, whether the PUCCH for the SR and BR includes 'SR', 'BR', or 'SR and BR' may be distinguished based on two or more difference sequences and puncturing patterns. Table 11 shows a method in which the SR and BR are multiplexed based on two sequences and one puncturing pattern. Like Table 11, when transmitting only the BR or both the SR and BR, the UE may transmit the same using different sequences. In addition, when transmitting only the SR, the UE may not carry a signal on a specific RC by applying a puncturing pattern to Seq. #1 used for the BR transmission.

TABLE 11

| Seq. #1 with puncturing pattern | Seq. #1 with no puncturing | Seq. #2 with no puncturing |
|---|---|---|
| SR only | BR only | SR + BR |

Other than Tables 9 to 11, the present disclosure includes various methods for distinguishing the SR from the BR and for multiplexing the SR and BR, which can be composed with the number of Seq. usages, the number of puncturing patterns, and combinations thereof.

In addition, when the SR and BR to be transmitted by the UE overlap in a specific slot, the UE may prioritize the SR or BR at the time of multiplexing the SR and BR, and transmit a corresponding sequence using a corresponding PUCCH only for indication for the SR or BR. Thereafter, the UE may transmit request information about the lower priority through another resource. For the priorities of the SR and BR, the priority of the BR may be set higher. In this case, after sequence transmission for the BR, a beam failure recovery mechanism operates. The SR is transmitted through a UL channel (namely, a PUCCH or a PUSCH) generated in this case, and a delay for the SR may be reduced. On the contrary, for the priorities of the SR and BR, the priority of the SR may be set higher. In this case, PUCCH or PUSCH transmission may occur after the SR transmission. Here, the UE may transmit the BR through a corresponding channel to reduce delay for the BR.

According to another embodiment of the present disclosure, PUCCH resources for the respective SR and BR may be independently configured for the SR and BR. Table 12 shows a configuration of a PUCCH resource for the BR according to an embodiment of the present disclosure.

When a PUCCH resource is allocated so as not to overlap or is allowed to overlap, the SR and BR may be composed independently. Table 12 shows the structure of a configuration for PUCCH resource allocation of the SR and BR. For convenience for explanation, the SR composition is assumed to operate identically to the LTE. In this case, Table 12 shows a message structure in which only parameters corresponding to the BR among a plurality of parameters are included in the configuration. In the example of Table 12, descriptions about the parameters are the same as those in Table 8.

TABLE 12

```
SchedulingBeamRecoveryRequestConfig ::= CHOICE {
    release NULL,
    setup SEQUENCE {
        br-PUCCH-ResourceIndex INTEGER (0. .2047),
        br-ConfigIndex INTEGER (0. .157),
        br-TransMax ENUMERATED {n4, n8, n16, n32, n64, spare3, spare2, spare1}
    }
}
MAC-MainConfig ::= SEQUENCE {
    . . .
    [[ br-Timer INTEGER (0, . . .7) OPTIONAL -- Need ON
    ]],
    . . .
}
```

According to an embodiment, the UE may configure a separate PUCCH resource for each transmission of the SR and BR. Here, an SR-PUCCH resource for the SR transmission and a BR-PUCCH resource for the BR transmission may be configured not to overlap in a time domain or frequency domain. In this case, the base station may detect the corresponding PUCCH resource to determine whether the SR or BR has been received.

Meanwhile, even when the SR-PUCCH resource and the BR-PUCCH resource are independent from each other, respective PUCCHs for the SR and BR may be allocated to a single resource in a region in which the corresponding uplink control channel is transmitted. In this case, the UE may transmit only a single PUCCH in the corresponding region. In this case, the UE may transmit a PUCCH for multiplexed SR and BR. For example, the UE may transmit the PUCCH for the SR or the PUCCH for the BR using different sequences respectively corresponding to the SR and BR. In addition, when the SR and BR are simultaneously transmitted, the UE may use the sequence corresponding to the BR to transmit the PUCCH for the multiplexed SR and BR through the SR-PUCCH resource. In addition, the UE may use the sequence corresponding to the SR to transmit the PUCCH for the multiplexed SR and BR through the BR-PUCCH resource.

Alternatively, the UE may use a puncturing pattern corresponding to any one of the SR and BR to transmit the PUCCH for the SR or the PUCCH for the BR based on a sequence punctured from the base sequence. For example, the base station may configure the puncturing pattern corresponding to the SR. In this case, the UE may puncture the base sequence based on the puncturing sequence corresponding to the SR. In addition, the UE may use the punctured sequence to transmit the PUCCH for the SR. In addition, the UE may use the base sequence, which is not punctured, to transmit the PUCCH for the BR. When the SR and BR are simultaneously transmitted, the UE may use the base sequence to transmit the PUCCH for the multiplexed SR and BR through the SR-PUCCH resource. Alternatively, the UE may use the punctured sequence to transmit the PUCCH for the multiplexed SR and BR through the SR-PUCCH resource.

On the contrary, the base station may configure the puncturing pattern corresponding to the BR. In this case, the UE may puncture the base sequence based on the puncturing sequence corresponding to the BR. In addition, the UE may use the punctured sequence to transmit the PUCCH for the BR. Furthermore, the UE may use the base sequence, which is not punctured, to transmit the PUCCH for the SR. When the SR and BR are simultaneously transmitted, the UE may use the base sequence to transmit the PUCCH for the multiplexed SR and BR through the BR-PUCCH resource. Alternatively, the UE may use the punctured sequence to transmit the PUCCH for the multiplexed SR and BR through the SR-PUCCH resource.

Meanwhile, the aforementioned SR-PUCCH resource and BR-PUCCH resource may overlap in a time domain and a frequency domain. For example, the SR-PUCCH resource and the BR-PUCCH resource may overlap in the time domain. In a state where the transmission for the SR and the BR is necessary, the UE may transmit any one between a PUCCH for the SR and a PUCCH for the BR based on the priority of each of the SR and BR. Alternatively, when a single PUCCH resource is configured for the SR and BR is, the UE may transmit any one of the SR and BR through the PUCCH resources for the SR and BR. In this case, when detecting a PUCCH through the PUCCH resource for the SR and BR, the base station may determine that a request having a higher priority between the SR and BR has been received. The base station may perform subsequent operations on the request of the higher priority between the SR and BR. Next, the UE may transmit the other one between the SR and BR through a resource capable of transmitting an uplink among subsequent resources.

In more detail, the UE may set the priority of the BR higher than that of the SR. Since the BR is a request to be transmitted when a link is lost, the UE may prioritize the BR in comparison to the request for scheduling. In a state where the transmission of the SR and BR is necessary, the UE may transmit the BR through the PUCCH resource or the BR-PUCCH resource configured for the SR and BR. Then, the UE may transmit the SR through the subsequent PUCCH resource or PUSCH resource. In this case, the subsequent PUCCH resource or PUSCH resource may be a resource allocated by the base station through the higher priority request, BR. Through this, the UE may reduce delay for the SR transmission. On the contrary, the UE may set the priority of the SR higher than that of the BR. In this case, the UE may transmit the BR through the SR-PUCCH resource or the PUCCH resource configured for the SR and BR. Then, the UE may transmit the BR through the subsequent PUCCH resource or PUSCH resource. Through this, the UE may reduce delay for the BR transmission.

For the SR and BR transmission, the base station may use an RRC signal to semi-statically configure a PUCCH transmission resource. It is because it is difficult for the base station to predict a time for transmitting the corresponding request. On the other hand, for HARQ-ACK information, the base station uses DCI to dynamically configure the PUCCH transmission resource, or to semi-statically configure the PUCCH transmission resource using the RRC signal. It is because the HARQ-ACK information is a response to downlink transmission from the base station. The base station may be aware of a transmission time of the HARQ-ACK information. Hereinafter, descriptions will be provided more specifically about a method for a UE according to an embodiment of the present disclosure transmitting the SR, the BR and the HARQ-ACK with reference to Tables 13 to 18.

According to an embodiment of the present disclosure, the UE may simultaneously transmit the SR, the BR and the HARQ-ACK information using a PUCCH. In this case, the UE may multiplex the SR, the BR and the HARQ-ACK information. In addition, the UE may use a single PUCCH to simultaneously transmit the multiplexed SR, BR, and HARQ-ACK information. The UE may multiplex the SR, the BR, and the HARQ-ACK information based on sequences allocated to transmit the SR, the BR, and the HARQ-ACK information. In addition, the UE may multiplex the SR, the BR, and HARQ-ACK information based on PUCCH resources configured to transmit the SR, the BR, and the HARQ-ACK information. Alternatively, the UE may simultaneously transmit one or two among the SR, the BR, and the HAQRQ-ACK information based on respective priorities of the SR, the BR and the HARQ-ACK information. Hereinafter, for convenience of description, a transmission method in which the HARQ-ACK information is represented with 1 bit is described, but the present disclosure is not limited thereto. Even when the HARQ-ACK information is represented with 2 bits, the transmission method described below will be identically or correspondingly applied. More specifically, the HARQ-ACK information may be classified into ACK and NACK. In addition, the SR is classified into a positive SR and a negative SR. In addition, the BR is classified into a positive BR and a negative BR.

According to an embodiment, the base station may configure 3 PUCCH resources for each transmission of the SR, the BR, and the HARQ-ACK information. In other words, when allocated with three PUCCH resources which are different from each other, the UE may simultaneously transmit the SR, the BR and the HARQ-ACK information through the PUCCH using three sequences which are different from each other. Here, the three PUCCH resources may be represented with resource 1, resource 2, and resource 3. In addition, the three sequences may be represented with seq. #1, seq. #2, and seq. #3. Table 13 shows sequences and PUCCH resources mapped to respective states, when one bit HARQ-ACK information, the SR, and the BR are multiplexed using the three PUCCH resources and the three sequences. In Table 13, when the HARQ-ACK information is NACK and is 'NACK only' that the SR and BR are not transmitted, the UE may not transmit the PUCCH. In addition, the UE may use the puncturing pattern described in Tables 10 and 11 to distinguish the states in Table 13 from each other. For example, when one base sequence is used, the UE may distinguish the states in Table 13 based on two puncturing patterns.

TABLE 13

| States | Combination of sequence and PUCCH resource |
| --- | --- |
| ACK only | Seq.#1 + resource 1 |
| ACK + SR | Seq.#1 + resource 2 |
| ACK + BR | Seq.#1 + resource 3 |
| ACK + SR + BR | Seq.#3 + resource 1 |
| NACK only | Seq.#2 + resource 1 or no transmission |
| NACK + SR | Seq.#2 + resource 2 |
| NACK + BR | Seq.#2 + resource 3 |
| NACK + SR + BR | Seq.#3 + resource 2 or Seq. #3 + resource 3 |

According to an embodiment, the UE may transmit the SR, the BR, and the HARQ-ACK information through a single PUCCH resource for transmitting any two among the SR, the BR, and the HARQ-ACK information and another PUCCH resource for transmitting the remained one. The base station may configure the PUCCH resource for transmitting any two among the SR, the BR, and the HARQ-ACK information and the other PUCCH resource for transmitting the remained one. In other words, when the UE is allocated with two different PUCCH resources, the base station may configure, for example, a BR-PUCCH resource for transmitting the BR and one SR-HARQ-PUCCH resource for transmitting the SR and HARQ-ACK information. In this case, the UE may use four different sequences to transmit the SR, the BR and the HARQ-ACK information through the PUCCH. Here, the two different PUCCH resources may be represented with resource 1, and resource 2. In addition, the four sequences may be represented with seq. #1, seq. #2, seq. #3, seq. #4. Table 14 shows sequences and PUCCH resources mapped to respective states, when one bit HARQ-ACK information, the SR, and the BR are multiplexed using the two PUCCH resources and the four sequences.

In Table 14, the PUCCH resource 1 may be configured to a PUCCH resource for transmitting the HARQ-ACK information. In addition, PUCCH resource 2 may be configured to a PUCCH resource for transmitting the SR and BR. Here, when the UE transmits the PUCCH through resource 1, the base station may determine that the HARQ-ACK information represents ACK. In addition, the base station may distinguish transmissions of 'a negative SR and a negative BR', 'a positive SR', 'a positive BR', and 'a positive SR and a positive BR' from each other based on a PUCCH sequence detected from resource 1. When the UE transmits a PUCCH through resource 2, the base station may determine that the HARQ-ACK information indicates NACK. In addition, the base station may distinguish transmission of 'a negative SR and a negative BR', 'a positive SR', 'a positive BR', and 'a positive SR and a positive BR' from each other based on a PUCCH sequence detected from resource 2. In addition, the UE may use the puncturing pattern described in Tables 10 and 11 to distinguish the states in Table 14 from each other.

TABLE 14

| States | Combination of sequence and PUCCH resource |
| --- | --- |
| ACK only | Seq.#1 + resource 1 |
| ACK + SR | Seq.#1 + resource 1 |
| ACK + BR | Seq.#1 + resource 1 |
| ACK + SR + BR | Seq.#3 + resource 1 |
| NACK only | Seq.#2 + resource 2 or no transmission |
| NACK + SR | Seq.#2 + resource 2 |
| NACK + BR | Seq.#2 + resource 2 |
| NACK + SR + BR | Seq.#3 + resource 2 |

Table 15 shows sequences and PUCCH resources mapped to respective states, when 2-bit HARQ-ACK information, the SR, and the BR are multiplexed using the two PUCCH resources and eight sequences. For example, one PUCCH resource for transmitting the SR and the BR, and one PUCCH resource for transmitting the HARQ-ACK information may be configured. In Table 15, resource 1 may be a PUCCH resource used when a first bit between the two bit HARQ-ACK information is ACK. In addition, resource 2 may be configured as a PUCCH resource for transmitting the SR and the BR. Here, when the UE transmit the PUCCH through resource 1, the base station may determine that the first bit between the 2-bit HARQ-ACK information indicates ACK. In addition, the base station may determine whether a second bit between the 2-bit HARQ-ACK information is ACK or NACK, and distinguish transmissions of 'a negative SR and a negative BR', 'a positive SR', 'a positive BR', and 'a positive SR and a positive BR' from each other based on a PUCCH sequence detected from resource 1. On the contrary, when the UE transmit a PUCCH through resource 2, the base station may determine that a second bit between the 2-bit HARQ-ACK information indicates NACK. In addition, the base station may determine whether a second bit between the 2-bit HARQ-ACK information is ACK or NACK, and distinguish transmission of 'a negative SR and a negative BR', 'a positive SR', 'a positive BR', and 'a positive SR and a positive BR' from each other based on a PUCCH sequence detected from resource 2. In addition, the UE may use the puncturing pattern described in Tables 10 and 11 to distinguish the states in Table 15 from each other.

TABLE 15

| States | Combination of sequence and PUCCH resource |
| --- | --- |
| (ACK, ACK) only | Seq.#1 + resource 1 |
| (ACK, ACK) + SR | Seq.#2 + resource 1 |
| (ACK, ACK) + BR | Seq.#3 + resource 1 |
| (ACK, ACK) + SR + BR | Seq.#4 + resource 1 |
| (ACK, NACK) only | Seq.#5 + resource 1 or no transmission |
| (ACK, NACK) + SR | Seq.#6 + resource 1 |
| (ACK, NACK) + BR | Seq.#7 + resource 1 |
| (ACK, NACK) + SR + BR | Seq.#8 + resource 1 |
| (NACK, ACK) only | Seq.#1 + resource 2 |
| (NACK, ACK) + SR | Seq.#2 + resource 2 |
| (NACK, ACK) + BR | Seq.#3 + resource 2 |
| (NACK, ACK) + SR + BR | Seq.#4 + resource 2 |
| (NACK, NACK) + only | Seq.#5 + resource 2, or no transmission |
| (NACK, NACK) + SR | Seq.#6 + resource 2 |
| (NACK, NACK) + BR | Seq.#7 + resource 2 |
| (NACK, NACK) + SR + BR | Seq.#8 + resource 2 |

Meanwhile, unlike Table 15, when 2-bit HARQ-ACK information is bundled, the UE may multiplex the 2-bit HARQ-ACK information, the SR and the BR in the method described through Tables 10, 11 and 13. It is because that when the 2-bit HARQ-ACK information is bundled, the 2-bit HARQ-ACK information may be represented with one bit.

According to an embodiment, the base station may configure one PUCCH resource for transmitting the SR, the BR and the HARQ-ACK information. In other words, when the UE is allocated with one PUCCH resource, the base station may configure, for example, a SR-HARQ-PUCCH resource for transmitting the BR, the SR and the HARQ-ACK information. In this case, the UE may use eight different sequences to transmit the SR, the BR and the HARQ-ACK information through the PUCCH. In addition, the eight sequences may be represented with seqs. #1 to #8. Table 16 shows sequences and a PUCCH resource mapped to respective states, when 1-bit HARQ-ACK information, the SR, and the BR are multiplexed using the one PUCCH resource and eight sequences. In addition, unlike Table 16, the UE may use the puncturing pattern described in Tables 10 and 11 to distinguish the states in Table 16 from each other. On the other hand, when the HARQ-ACK information is 2 bits, the UE may use one PUCCH resource and a plurality of sequences to multiplex the 2-bit HARQ-ACK information, the SR and the BR. In addition, when the 2-bit HARQ-ACK information is bundled, the UE may multiplex the 2-bit HARQ-ACK information, the SR and the BR in the same method described in Table 16.

TABLE 16

| States | Combination of sequence and PUCCH resource |
|---|---|
| ACK only | Seq.#1 + resource 1 |
| ACK + SR | Seq.#2 + resource 1 |
| ACK + BR | Seq.#3 + resource 1 |
| ACK + SR + BR | Seq.#4 + resource 1 |
| NACK only | Seq.#5 + resource 1 or no transmission |
| NACK + SR | Seq.#6 + resource 1 |
| NACK + BR | Seq.#7 + resource 1 |
| NACK + SR + BR | Seq.#8 + resource 1 |

According to an embodiment, the UE may transmit a PUCCH for any one among the SR, the BR and the HAQRQ-ACK information based on respective priorities of the SR, the BR and the HARQ-ACK information. In this case, the UE may use sequences mapped to states to transmit the PUCCH through a PUCCH resource allocated to the states. According to an embodiment, the UE may transmit a PUCCH for any two among the SR, the BR and the HAQRQ-ACK information based on respective priorities of the SR, the BR and the HARQ-ACK information. In this case, the UE may multiplex any two among the SR, the BR and the HARQ-ACK information in the aforementioned multiplexing method for the SR and the BR. Table 17 shows sequences and PUCCH resources mapped to respective states, when one bit HARQ-ACK information, the SR, and the BR are transmitted using three PUCCH resources and two sequences. Here, the priority of the SR may be configured to be lower than those of the BR and the HARQ-ACK information. In addition, the UE may transmit a PUCCH for the BR and the HARQ-ACK information based on respective priorities of the SR, the BR and the HARQ-ACK information. In this case, the UE may transmit the SR through the subsequent PUCCH resource or PUSCH resource. Through this, the UE may reduce delay for the BR transmission. In addition, the UE may use the puncturing pattern described in Tables 10 and 11 to distinguish the states in Table 17 from each other.

TABLE 17

| States | Combination of sequence and PUCCH resource |
|---|---|
| ACK only | Seq.#1 + resource 1 |
| ACK + SR | Seq.#1 + resource 2 |
| ACK + BR | Seq.#1 + resource 3 |
| ACK + SR + BR | Follow ACK + BR except SR |
| NACK only | Seq.#2 + resource 1 or no transmission |
| NACK + SR | Seq.#2 + resource 2 |
| NACK + BR | Seq.#2 + resource 3 |
| NACK + SR + BR | Follow NACK + BR except SR |

Table 18 shows a multiplexing method when 2-bit HARQ-ACK information, an SR and a BR are transmitted according to the priorities of the HARQ-ACK information, the SR and the BR. As described above, when the 2-bit HARW-ACK information is bundled, the UE may multiplex the 2-bit HARQ-ACK information, the SR and the BR in the same method described through Table 15. When the 2-bit HARQ-ACK information is not bundled, the UE may transmit a PUCCH for the 2-bit HARQ-ACK information and the BR by applying the aforementioned method to the multiplexed states to which the priorities are applied in Table 18.

TABLE 18

| Multiplexed states before applying priority | Multiplexed states after applying priority |
|---|---|
| (ACK, ACK) + BR + SR | (ACK, ACK) + BR |
| (ACK, NACK) + BR + SR | (ACK, NACK) + BR |
| (NACK, ACK) + BR + SR | (NACK, ACK) + BR |
| (NACK, NACK) + BR + SR | (NACK, NACK) + BR |

Meanwhile, according to an embodiment of the present disclosure, the base station may configure a BR-PUCCH resource for transmitting a BR and one SR-HARQ-PUCCH resource for transmitting an SR and HARQ-ACK information. For example, the SR and the HARQ-ACK information may be multiplexed and transmitted through an SR-HARQ-PUCCH resource. In this case, the UE may transmit at least any one between the SR and the HARQ-ACK information through the SR-HARQ-PUCCH resource according to the aforementioned method in which the SR and the HARQ-ACK information are simultaneously transmitted. For example, the UE may multiplex the HARQ-ACK information and the SR in the method described through Table 6 (1-bit HARQ-ACK) and Table 7 (2-bit HARQ-ACK).

In addition, when the transmission of at least one between the SR and the HARQ-ACK information overlaps the BR transmission, the UE may use a PUCCH to simultaneously transmit the BR and at least one between the SR and the HARQ-ACK information. For example, the UE may simultaneously transmit the BR and at least one between the SR and the HARQ-ACK information through a PUCCH resource used for transmitting the SR and the HARQ-ACK information between the BR-PUCCH resource and the SR-HARQ-PUCCH resource. Here, the UE may determine one PUCCH resource between the BR-PUCCH resource and SR-HARQ-PUCCH resource as the PUCCH resource used for transmitting the SR and HARQ-ACK information based on whether the BR is a positive BR. In more detail, when transmitting the positive BR, the UE may transmit the SR and the HARQ-ACK information through the BR-PUCCH resource. On the contrary, when transmitting a negative BR, the UE may transmit the SR and the HARQ-ACK information through the SR-HARQ-PUCCH resource.

In this case, the base station may detect a PUCCH from the BR-PUCCH resource and the SR-HARQ-PUCCH resource to determine whether the BR has been received. For example, when detecting the SR and HARQ-ACK information from the BR-PUCCH resource, the base station may determine that the positive BR has been received. In addition, the base station may acquire the HARQ-ACK information and whether the SR is the positive SR through a sequence used for transmitting the SR and the HARQ-ACK information. On the contrary, when detecting the SR and the HARQ-ACK information from the SR-HARQ-PUCCH resource, the base station may determine that the negative BR has been received.

A channel selection method for detecting whether a BR has been transmitted by configuring the BR-PUCCH as a separate resource from the SR-HARQ-PUCCH may be identically applied to various methods capable of configuring to simultaneously transmit the SR and HARQ-ACK information on a single resource. As an embodiment, when the HARQ-ACK information is 1 bit, the UE may simultaneously transmit the SR and the 1-bit HARQ-ACK information using four different values cyclic-shifted from a root or base sequence transmitted through a PUCCH resource. Alternatively, when the HARQ-ACK information is 2 bits, the UE may simultaneously transmit the SR and the 2-bit HARQ-ACK information through eight different values cyclic-shifted from the root or base sequence transmitted through a PUCCH resource. A method may be applied identically or correspondingly for the two aforementioned cases, the method being that the base station determines whether the BR has been transmitted from the UE by means of channel selection according to whether the BR has been transmitted.

As described above, since the transmission time of the SR or the BR is determined by the UE, it may be difficult for the base station to allocate PUCCH resources using DCI. On the other hand, the base station may allocate PUCCH resources through DCI so that the UE reports channel or beam-related information. Here, when the SR (or BR) transmission by the UE overlaps the PUCCH transmission for reporting, which is allocated through the DCI, the UE may transmit the SR (or BR) through the reporting PUCCH. Specifically, the UE may transmit the SR (or BR) and the reporting PUCCH through a reporting PUCCH resource allocated through the DCI. In addition, the UE may configure 2 bits respectively indicating the SR and the BR to transmit the 2 bits through the reporting PUCCH. Table 19 shows bits configured according to the SR and the BR. In Table 19, SR on/off respectively represent a positive SR and a negative SR. In addition, in Table 19, BR on/off respectively represent a positive BR and a negative BR.

TABLE 19

|  | SR on | SR off |
|---|---|---|
| BR on | 1, 1 | 1, 0 |
| BR off | 0, 1 | 0, 0 |

Meanwhile, according to an embodiment, when only 1 bit transmission is possible through the reporting PUCCH, the UE may transmit request information through the reporting PUCCH, the request information representing a request for a higher priority between the SR and the BR according to the priorities of the SR and BR. In addition, when detecting a PUCCH through the PUCCH resources for the SR and the BR, the base station may determine that the information representing a request for a higher priority between the SR and the BR has been received. In this case, when the information representing the request is 1, the base station may determine the request to be positive. In addition, when the information representing the request is 0, the base station may determine the request to be negative. Then, the UE may transmit a lower priority request through the subsequent PUCCH resource or PUSCH resource. Through this, the UE may reduce delay for the transmission of the lower priority request.

The UE according to an embodiment of the present disclosure may simultaneously transmit a PUCSH and a PUCCH. Here, the PUCCH may be transmitted using any one among PUCCH formats classified as the aforementioned long PUCCH. Like the existing LTE(-A) system, in an NR system, when simultaneous transmission of the PUSCH and the PUCCH is configured to the UE in a specific subframe, the UE may simultaneously transmit the PUSCH and the PUCCH. For example, the base station may configure the UE to simultaneously transmit the PUSCH and the PUCCH in a manner that whether to simultaneous transmit the PUSCH and the PUCCH is turned on or off through an RRC signal. Here, the UE may transmit the PUSCH and the PUCCH through the same subcarrier or different subcarriers.

However, when the simultaneous transmission of the PUSCH and the PUCCH is not configured to the UE in a specific subframe, the UE may transmit UCI only through the PUCCH unless the PUSCH transmission is not scheduled in the subframe. In this case, when the PUSCH transmission is scheduled in the subframe, the UE may piggyback UCI to be transmitted through the PUCCH on the PUSCH, and then transmit the UCI. This may be also applied identically or correspondingly to a case in which carriers are aggregated. On the other hand, in the NR system, the UCI may include beam-related information or beam management information for beamforming through a millimeter wave (mmWave).

According to an embodiment of the present disclosure, the UE, which has received an RRC signal in which a PUSCH-PUCCH configuration parameter is on, may simultaneously transmit the PUSCH and the PUCCH, the parameter representing whether simultaneous transmission of the PUSCH and the PUCCH is configured. For example, when the simultaneous transmission of the PUSCH and the PUCCH is necessary, the UE may transmit the PUSCH and the PUCCH in a single slot. Here, when an inter-modulation distortion (IMD) occurs in the UE, the UE may selectively transmit the PUSCH or the PUCCH, or an uplink channel of a format in which the simultaneous transmission is possible. Alternatively, when a signal attenuation level in another frequency domain, which caused by interference according to an IMD, meets an RF requirement, the UE may simultaneously transmit the PUSCH and the PUCCH. Here, transmitter inter-modulation represents inter-modulation between a transmission signal transmitted by the base station or the UE and another strong signal transmitted around the base station or the UE. Accordingly, in a state where a signal transmitted from another base station is co-located, a transmission signal from the other base station, which is detected through an antenna connector of the base station, may have a value attenuated by 30 dB. Here, additional unwanted emission may be restricted even when an interference signal is present. A transmission signal from another UE, which is detected through an antenna connector of the UE, may have a value attenuated by 40 dB.

At the time of simultaneous transmission of the PUSCH and the PUCCH, as the distance between frequency resources allocated to the transmission of the PUSCH and the PUCCH is longer, the IMD may increase. Meanwhile, the PUCCH resource may be configured to be closer to the edge of an uplink transmission band in order to obtain a frequency diversity gain. Accordingly, when the PUSCH and the PUCCH are simultaneously transmitted, the IMD may occur except a case where the PUSCH occupies the entire uplink transmission band. Here, the frequency resource may represent a subcarrier index of an RE. The UE according to an embodiment of the present disclosure may allocate the PUCCH frequency resource to a frequency resource at a location close to a PUSCH frequency resource. Hereinafter, when the PUSCH and the PUCCH are simultaneously transmitted according to an embodiment of the present disclosure, a method for the UE to configure the PUCCH resource will be specifically described through FIGS. 14 to 17.

Figure 14:
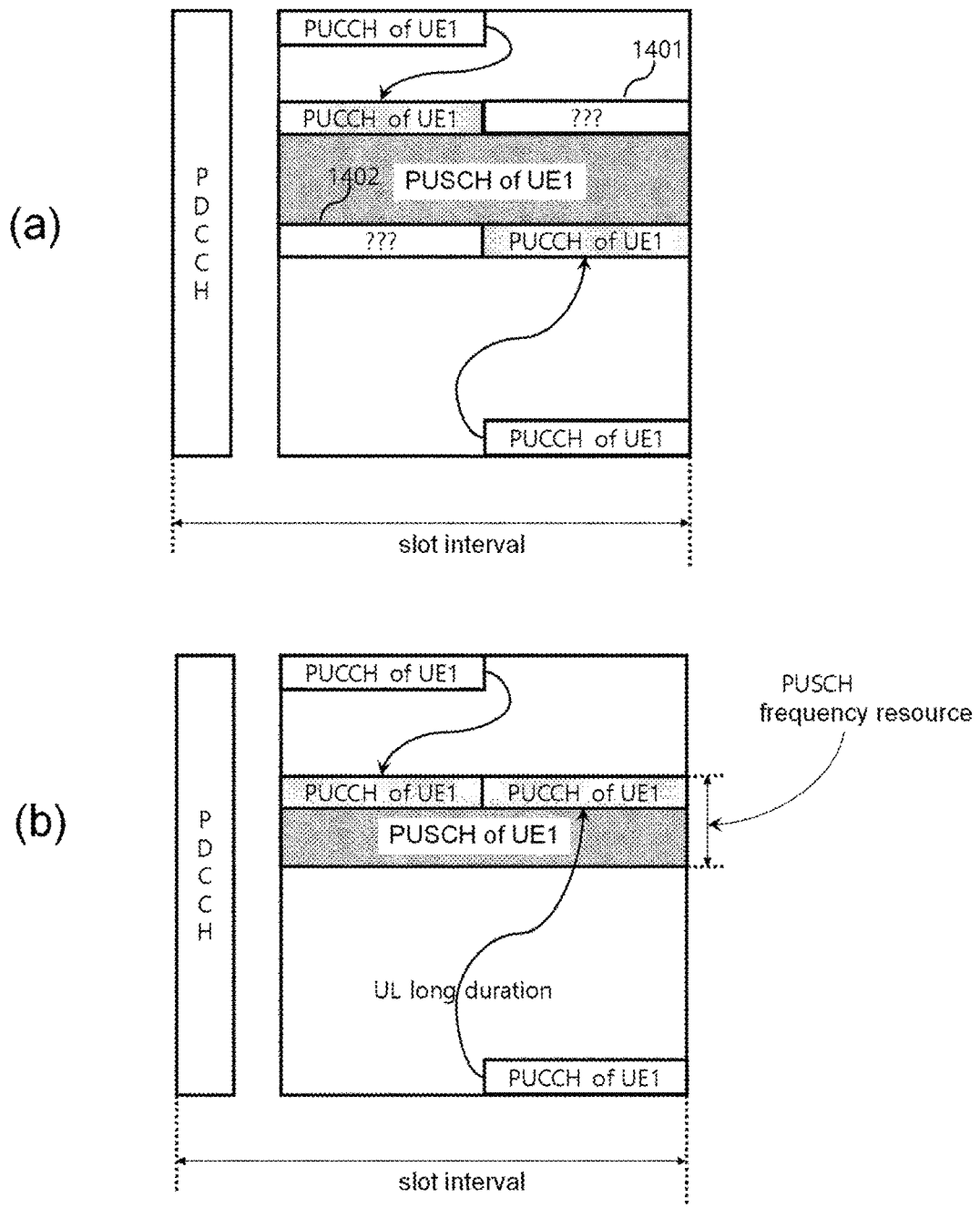
FIG. 14 illustrates PUCCH frequency resources allocated to frequency resources at locations consecutive to a PUSCH frequency resource according to an embodiment of the present disclosure.

FIG. 14 illustrates PUCCH frequency resources allocated to frequency resources at locations consecutive to a PUSCH frequency resource according to an embodiment of the present disclosure. Referring to FIG. 14A, PUCCHs may be mapped to frequency resources at locations consecutive to the PUSCH frequency resource allocated for PUSCH transmission. In this case, the frequency resources at the locations consecutive to the PUSCH frequency resource may represent frequency resources at adjacent locations. In addition, there may not be another frequency resource for separating the PUCCH frequency resources from the PUSCH resource between the PUCCH frequency resources and the PUSCH resource in the frequency domain. On the other hand, when two frequency resources are hopped so as to be able to obtain a frequency diversity gain as in FIG. 14A, data may be not allocated to resources of region "1401" and region "1402". Referring to FIG. 14B, PUCCH resources may be allocated to a part of the PUSCH resource. In addition, the PUCCH resource may not be frequency hopped. Through this, the UE may prevent a waste of resources in region "1401" and region "1402".

Figure 15:
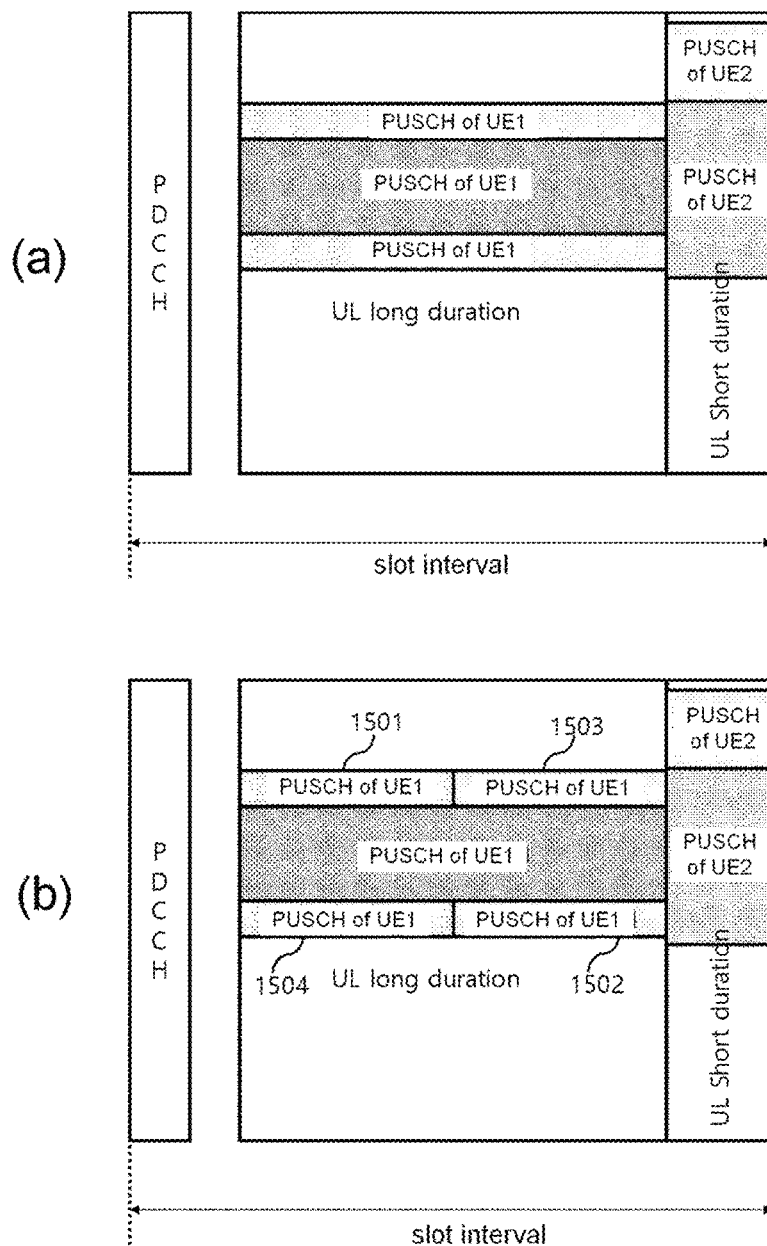
FIG. 15 illustrates PUCCH resources formed according to an embodiment of the present disclosure.

FIG. 15 illustrates PUCCH resources configured according to an embodiment of the present disclosure. In FIG. 15, region "1503" and region "1504" may correspond to region "1401" and region "1402" in FIG. 14A. Here, PUCCHs mapped to region "1503" and region "1504" may be repeated in region "1501" and region "1502". For example, the UE may transmit the PUCCHs mapped to region "1503" and region "1504" through resources corresponding to region "1501" and region "1502". In FIG. 15, an interval in which one PUCCH, the long PUCCH and the short PUCCH are transmitted may be called as a slot interval. Here, a symbol interval of each of regions "1501" to "1504" may denote a symbol interval allocated to a part of the PUCCH, when the PUCCH is frequency hopped in the interval in which the long PUCCH is transmitted in the slot interval. Through this, the UE may obtain time and frequency diversity gains in the PUCCH transmission.

Figure 16:
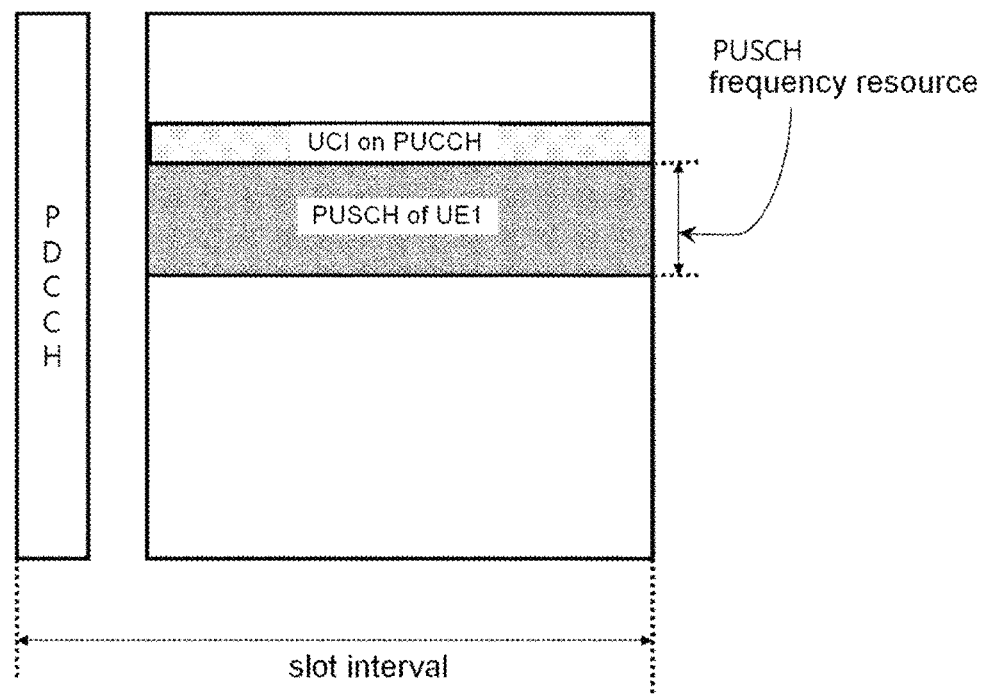
FIG. 16 illustrates a PUCCH resource formed according to an embodiment of the present disclosure.
Figure 17:
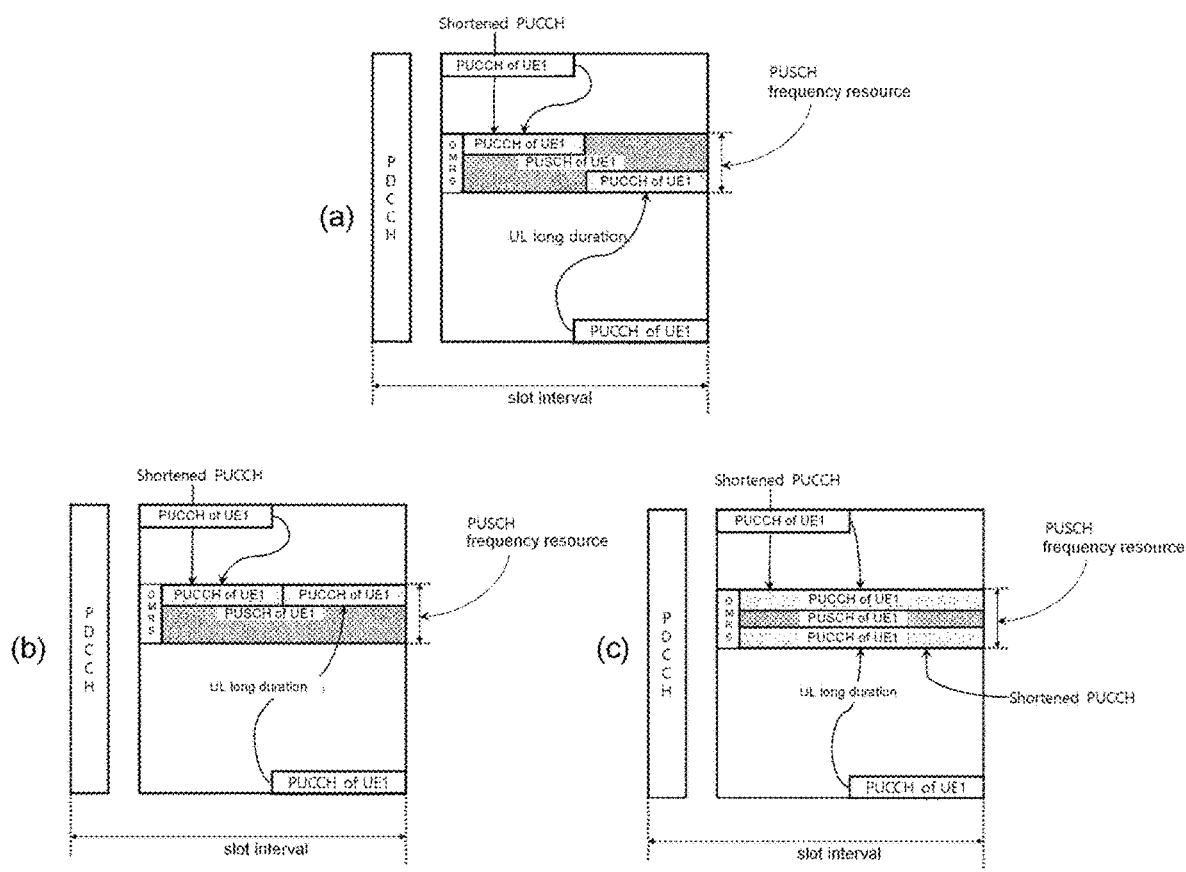
FIG. 17 illustrates a DMRS resource for transmitting a DMRS and PUCCH resources allocated to parts of a PUSCH resource according to an embodiment of the present disclosure.

FIG. 16 illustrates a PUCCH resource configured according to an embodiment of the present disclosure. Referring to FIG. 16, the UE may allocate a PUCCH resource to a part of a PUSCH resource without frequency hopping.

In the aforementioned FIGS. 14B and 16, when the PUCCH resource is allocated to a part of the PUSCH resource, the UE may configure a PUCCH resource based on the location of a resource through which a DMRS for the PUSCH is transmitted. This is because a resource through which the DMRS is transmitted may collide with and the PUCCH resource. For example, the UE may puncture a first symbol at which the PUSCH resource starts in the PUCCH resource for the PUCCH. Alternatively, the UE may configure a shortened PUCCH obtained by removing the first symbol at which the PUSCH resource starts in the PUCCH resource for the PUCCH. This is because a DMRS of the PUSCH may be transmitted when the DMRS is front loaded, namely, at the first symbol at which the PUSCH resource starts. When the PUCCH is the aforementioned long PUCCH, the shortened PUCCH may be referred to as a shortened long PUCCH. Here, the number of symbols forming the long PUCCH in a single slot may be any one among {4, 5, 6, 7, 8, 9, 10, 11, 12, 13, 14}.

When the number of symbols forming the long PUCCH is 4, the shortened long PUCCH may be configured with 3 symbols. Here, the base station may not be expected to receive the PUCCH in a symbol to which the DMRS is mapped among the PUSCH resources. Alternatively, when the number of symbols configuring the long PUCCH is 4, the UE may not allocate the PUCCH resource on the PUSCH resource according to the configuration of the base station. In this case, the UE may selectively transmit only one between the PUSCH and the PUCCH. In addition, the UE may transmit only one between the PUSCH and the PUCCH based on a type of the UCI transmitted through the PUCCH. For example, when the number of symbols configuring the PUCCH for the HARQ-ACK information is 4, the UE may transmit only the PUCCH between the PUSCH and the PUCCH to be transmitted simultaneously. It is because the HARQ-ACK information is a response to DL transmission. Alternatively, when the PUCCH composed of 4 symbols is configured from the base station, the UE may map UCI to be transmitted through the PUCCH resource to a preset PUSCH resource and transmit the UCI. Alternatively, the UE may not transmit the DMRS through the PUSCH resource.

Hereinafter, description will be provided through FIGS. 17A to 17C about a method for the UE to configure a PUCCH resource, when the PUCCH resource is moved onto a PUSCH resource and collides with a DMRS resource. FIGS. 17A to 17C illustrate the DMRS resource for transmitting the DMRS and the PUCCH resource allocated to a part of the PUSCH resource according to an embodiment of the present disclosure.

Referring to FIGS. 17B and 17C, another part of a PUSCH except a DMRS may not be allocated to a frequency resource to which a PUCCH is allocated. In this case, when the sequence characteristics of the DMRS, which is a part of the PUSCH, are to be maintained for MU-MIMO multiplexing with another UE, the base station may configure to transmit a shortened PUCCH to the UE, and the UE may perform transmission using the shortened PUCCH. On the other hand, when the DMRS, which is a part of the PUSCH, is not configured with a sequence and is not CDM-multiplexed for MU-MIMO with other UEs, since the PUSCH is not included in a region to which the PUCCH is moved, the long PUCCH may be transmitted without using the shortened PUCCH as shown in FIGS. 14 to 16.

According to an embodiment, when the PUCCH resource is allocated to a part of the PUSCH resource, the UE may puncture a symbol allocated to the PUCCH resource or a symbol allocated to the DMRS resource among the PUSCH resource. Here, UL DCI for scheduling the PUSCH may include a puncturing indicator for puncturing any one between the symbol allocated to the PUCCH resource and the symbol allocated to the DMRS resource. The UE may puncture any one between the symbol allocated to the PUCCH resource and the symbol allocated to the DMRS resource based on the puncturing indicator. More specifically, when the PUCCH resource is allocated to a first PUSCH resource that is a part of the PUSCH resource, the UE may puncture the first PUSCH resource. According to another embodiment, when the PUCCH is configured to be periodically transmitted, the first PUSCH resource may be configured to be rate-matched in a period at which the PUCCH is to be transmitted.

In addition, the base station may determine whether to puncture or rate-match the first PUSCH resource based on the UCI transmitted through the PUCCH. For example, when the PUCCH includes transmission of HARQ-ACK information, the UE may puncture the first PUSCH resource according to the configuration of the base station. In addition, when the PUCCH includes transmission of only the UCI other than the HARQ-ACK information, the UE may transmit the UCI through the first PUSCH resource rate-matched according to the configuration of the base station. Here, the UCI other than the HARQ-ACK information may include at least any one among a CQI, an RI, a PMI or beam-related information. When the DL transmission is lost, the HARQ-ACK information may not be transmitted. On the contrary, the base station having performed the DL transmission may expect to receive the HARQ-ACK information. In this case, when the PUSCH resource for transmitting the HARQ-ACK information is configured to be rate-matched and the DL transmission is lost, the base station may also fail to decode the UCI other than the HARQ-ACK information transmitted through the PUCCH. Unlike this, when the PUCCH includes only transmission of channel state reporting such as a CQI, an RI, a PMI or beam-related information, mismatch may not occur even when the first PUSCH resource is rate-matched. This is because the channel state reporting may be set to be periodically transmitted through the PUCCH. In addition, the transmission period of the channel state reporting may be configured through an RRC signal. Accordingly, the base station may predict a slot or a subframe in which the PUCCH including the channel state reporting is transmitted.

In the description about FIGS. 14 to 17, as a slot format, a UL-centric slot format is exemplified which represents a case where the number of UL symbols in a single slot is larger than that of the DL symbols, but the present disclosure is not limited thereto. For example, the method described through the FIGS. 14 to 17 may also be applied identically to a slot including only UL transmission. In addition, the DMRS resource allocated to transmit the DMRS for the PUSCH may not be front loaded. In addition, the DMRS resource may be additionally loaded to the front and an RE at a different location from the front. This is because an additional RS may be required to improve performance due to a high Doppler frequency environment.

Figure 18:
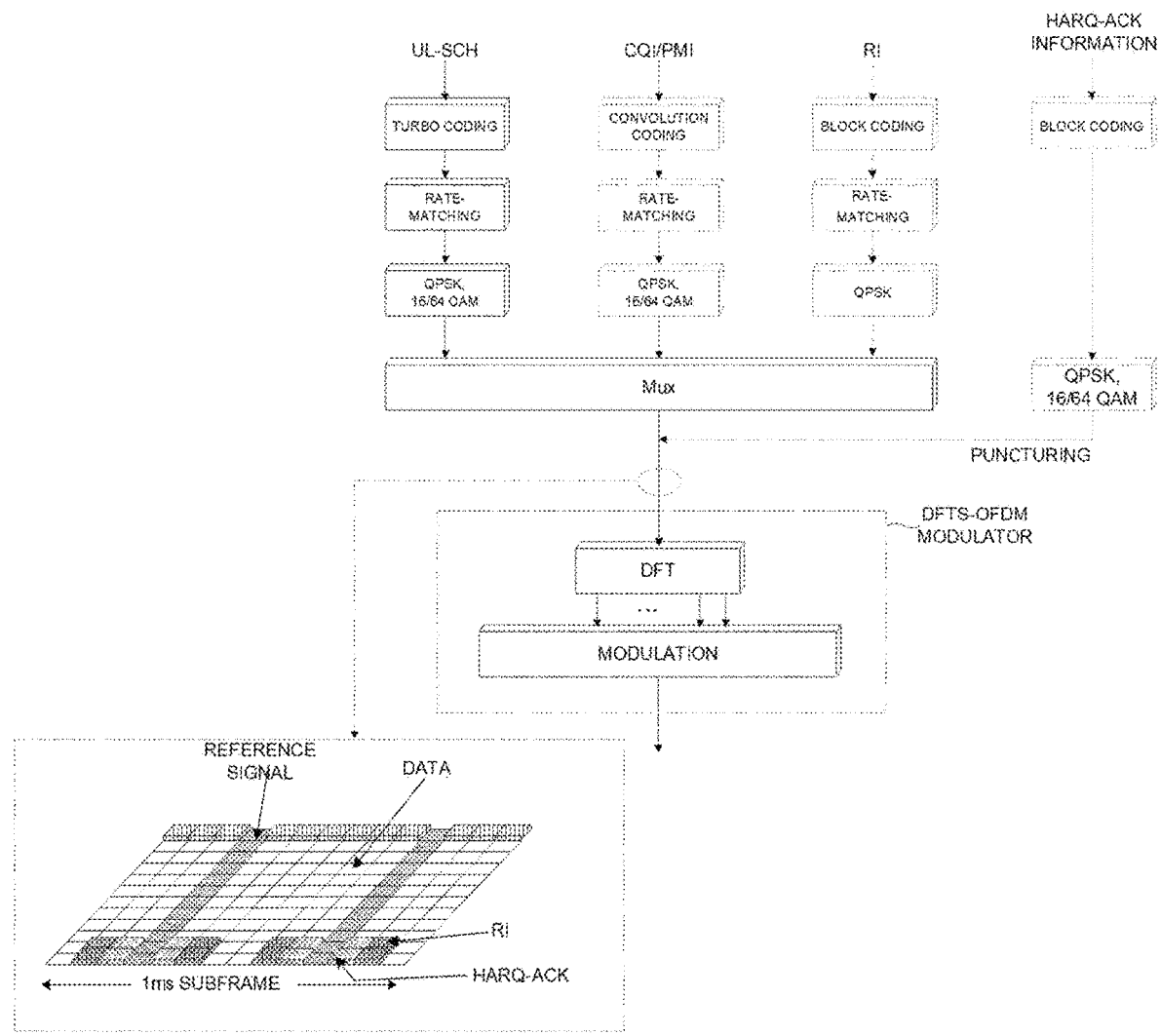
FIG. 18 illustrates HARQ-ACK information mapped onto a PUSCH resource according to an embodiment of the present disclosure.

Meanwhile, FIG. 18 illustrates HARQ-ACK information mapped onto a PUSCH resource according to an embodiment of the present disclosure. Referring to FIG. 14, the UE may transmit the HARQ-ACK information, which is one kind of the UCI, through a RE located close to a DMRS symbol for a UL DMRS. This is because as it is closer to the DMRS symbol, the higher the channel estimation performance. When transmitting a PUCCH that allocates an uplink transmission resource for the HARQ-ACK information, the base station may expect to receive the HARQ-ACK information from the UE. Here, when not receiving the PUCCH, the UE may not multiplex the HARQ-ACK information on the PUSCH. When the PUSCH for transmitting the HARQ-ACK information is transmitted through a rate-matched PUSCH resource, the base station may also fail to decode data other than the HARQ-ACK information received from the UE. This is because, when the PUSCH for transmitting the HARQ-ACK information is transmitted through a rate-matched PUSCH resource, a rate-matching pattern may vary according to whether the HARQ-ACK information is to be transmitted. Accordingly, the HARQ-ACK information may be punctured on a UL-SCH bitstream. When the HARQ-ACK information is punctured, data, which is not punctured on the PUSCH, may be decoded regardless of the presence or absence of the HARQ-ACK information.

In addition, referring to FIG. 18, an RI, which is one kind of the UCI, may be transmitted through an RE located close to the DMRS symbol similarly to a method for mapping HARQ-ACK information to an RE. This is because the RI is preferentially required in order to analyze the aforementioned CQI and PMI. As a modulation scheme for the RI, a modulation scheme is used which is identical to that for the HARQ-ACK information. The HARQ-ACK information and the RI may be repeated in multiple transmission layers, coated in each layer and then multiplexed. For example, a plurality of bits representing the HARQ-ACK information and the RI may be scrambled in each transmission layer according to different RNTIs. Through this, the UE may obtain a diversity gain through the multiple transmission layers.

The channel state reporting on the PUSCH resource may be performed aperiodically. For example, the base station may configure the UE to transmit the channel state reporting. The UE may rate-match a UL-SCH based on the presence or absence of the channel state reporting. For the channel state reporting, the UE may rate-match the UL-SCH to use a relatively high coding rate. In this case, the base station may recognize the presence or absence of the channel state reporting to perform rate-matching. This is because the base station requests for the channel state reporting. In addition, when the UE is scheduled to perform PUSCH transmission and periodic channel state reporting is configured to be transmitted on a PUCCH in a subframe in which the PUSCH is transmitted, the periodic channel state reporting of the UE may be changed to be transmitted on the PUSCH resource. In this case, the base station may recognize the presence or absence of the periodic channel state reporting to perform rate-matching. This is because the base station may recognize which frame the periodic reporting is transmitted in. In addition, the transmission time of the periodic reporting is set by an RRC signal.

According to an embodiment of the present disclosure, the UE, which has received an RRC signal in which a PUSCH-PUCCH configuration parameter is off, may not simultaneously transmit the PUSCH and the PUCCH, the parameter representing whether the simultaneous transmission of the PUSCH and the PUCCH is configured. Here, the UE may piggyback the UCI included in the PUCCH, which is to be simultaneously transmitted with the PUSCH, on the PUSCH resource and then transmit the UCI. Hereinafter, descriptions will be provided more specifically about a method for a UE according to an embodiment of the present disclosure to piggyback the UCI included in the PUCCH on the PUSCH and transmit the UCI with reference to FIGS. 19 to 23.

Figure 19:
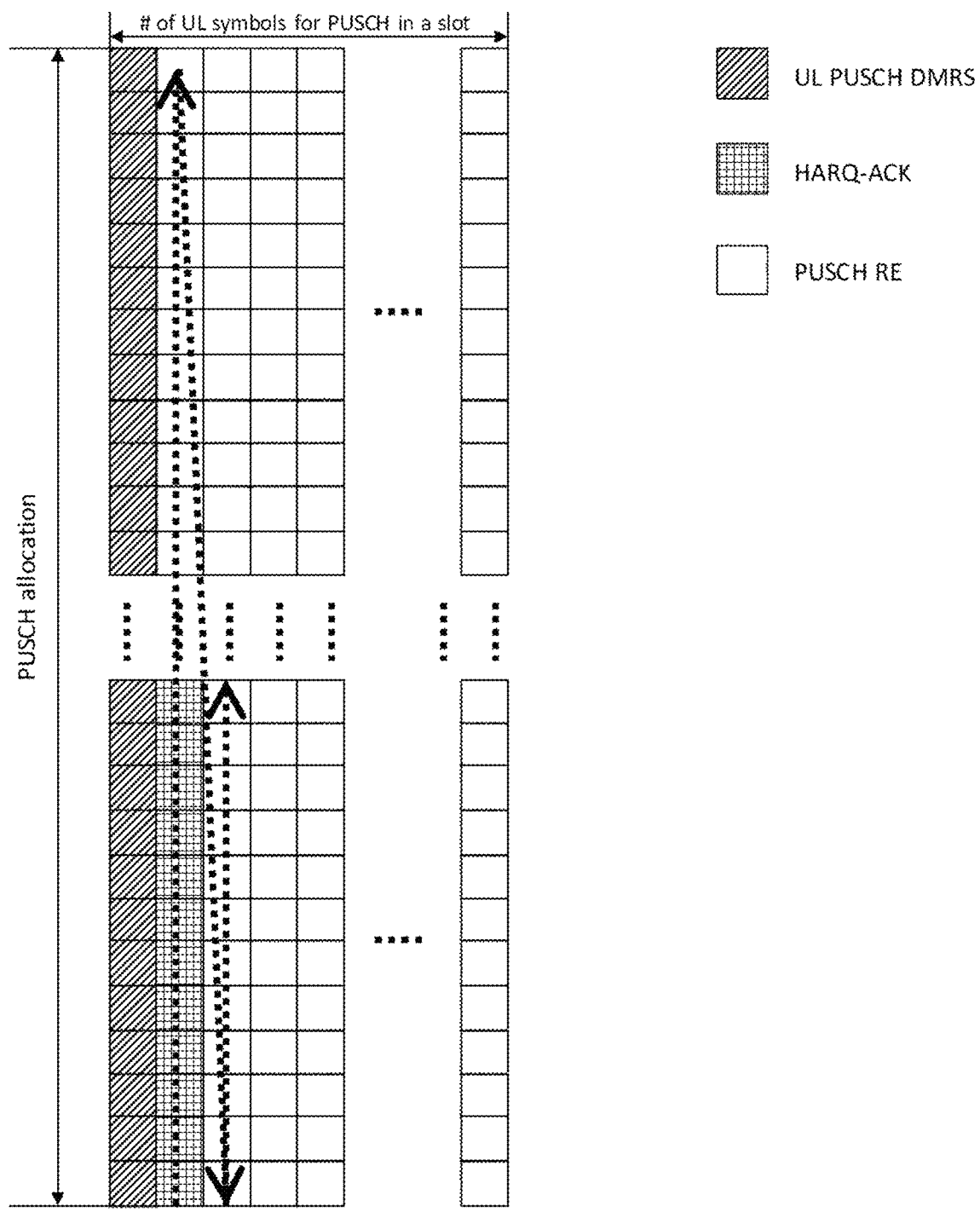
FIG. 19 illustrates HARQ-ACK information mapped onto a PUSCH resource according to another embodiment of the present disclosure.

FIG. 19 illustrates HARQ-ACK information mapped onto a PUSCH resource according to an embodiment of the present disclosure. According to an embodiment, the UE may preferentially map the HARQ-ACK information to be transmitted to a subcarrier corresponding to a symbol following a DMRS symbol. Here, the DMRS symbol may be a symbol allocated for a UL PUSCH DMRS allocated from the base station. Here, the symbol following the DMRS symbol among subsequent symbols of the DMRS symbol may be adjacent to the DMRS symbol. In addition, the number of REs necessary for the HARQ-ACK information to be transmitted by the UE may exceed the number of REs for each symbol of the PUSCH resource. In this case, the UE may additionally map the HARQ-ACK information to an RE of a symbol following the adjacent symbol. This is because as it is closer to the location of the DMRS symbol, the higher the channel estimation performance. The UE may compensate for reduction in the channel estimation performance in a higher Doppler frequency environment in which the UE moves fast and thus a channel in a slot changes fast. In addition, in a wireless communication environment using an mmWave, the UE may transmit the HARQ-ACK information in the same symbol to obtain a beamforming gain for the HARQ-ACK information. This is because, in the mmWave environment, beamforming may be performed in the same symbol.

Figure 20:
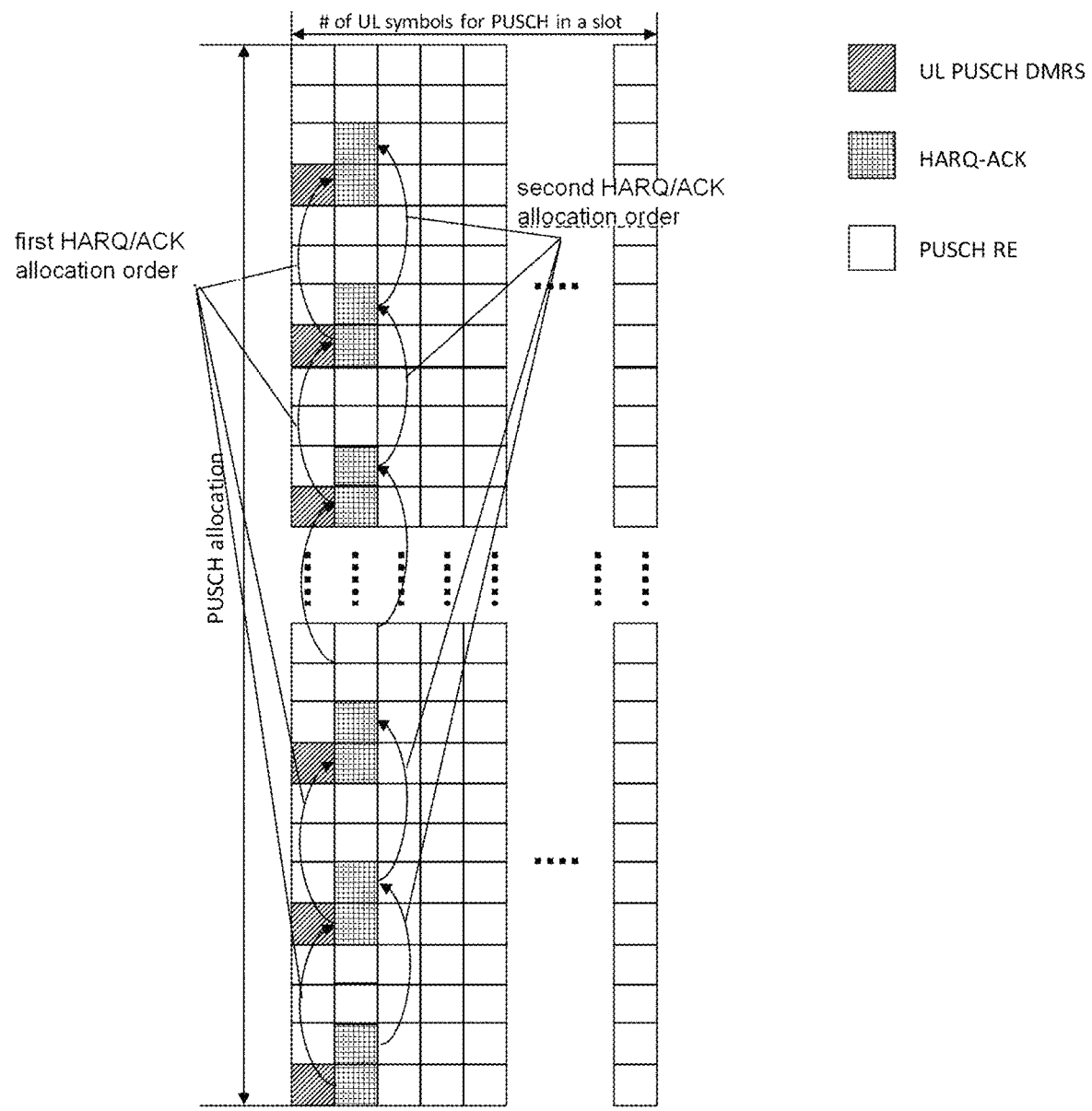
FIG. 20 illustrates HARQ-ACK information mapped onto a PUSCH resource according to another embodiment of the present disclosure.

FIG. 20 illustrates HARQ-ACK information mapped onto a PUSCH resource according to an embodiment of the present disclosure. According to an embodiment, a DMRS for a PUSCH may be allocated to distributed REs on a symbol in an interleaving frequency division multiple access (IFDMA) scheme. As in FIG. 20, a DMRS RE for the DMRS may be mapped to a resource spaced apart by a preset subcarrier interval on the same symbol. In this case, the UE may preferentially map the HARQ-ACK information to an RE corresponding to a subcarrier index of the DMRS RE among REs of a symbol following the DMRS symbol. In addition, the number of REs necessary for the HARQ-ACK information to be transmitted by the UE may exceed the number of DMRS REs. In this case, the UE may additionally map the HARQ-ACK information to an RE adjacent to the preferentially mapped RE in the frequency domain among REs of a symbol following the DMRS symbol. Here, the adjacent RE may be an RE corresponding to a subcarrier index continuous from the subcarrier index of the DMRS RE. Alternatively, unlike FIG. 20, the UE may additionally map the HARQ-ACK information to an RE adjacent to the DMRS RE in the frequency domain among REs of a symbol following the DMRS symbol. Alternatively, the UE may preferentially map the HARQ-ACK information to an RE adjacent to the DMRS RE among the REs of the DMRS symbol, and additionally map to an RE corresponding to the subcarrier index of the DMRS RE This is because as it is closer to the location of the DMRS symbol, the higher the channel estimation performance. The UE may compensate for reduction in the channel estimation performance in a higher Doppler frequency environment in which the UE move fast and thus a channel in a slot changes fast. In addition, in a wireless communication environment using an mmWave, the UE may transmit the HARQ-ACK information in the same symbol to obtain a beamforming gain for the HARQ-ACK information. This is because, in the mmWave environment, beamforming may be performed in the same symbol. In addition, the UE may additionally obtain a frequency diversity gain in comparison to the embodiment of FIG. 19 in HARQ-ACK information transmission in the PUSCH resource in the frequency domain.

Figure 21:
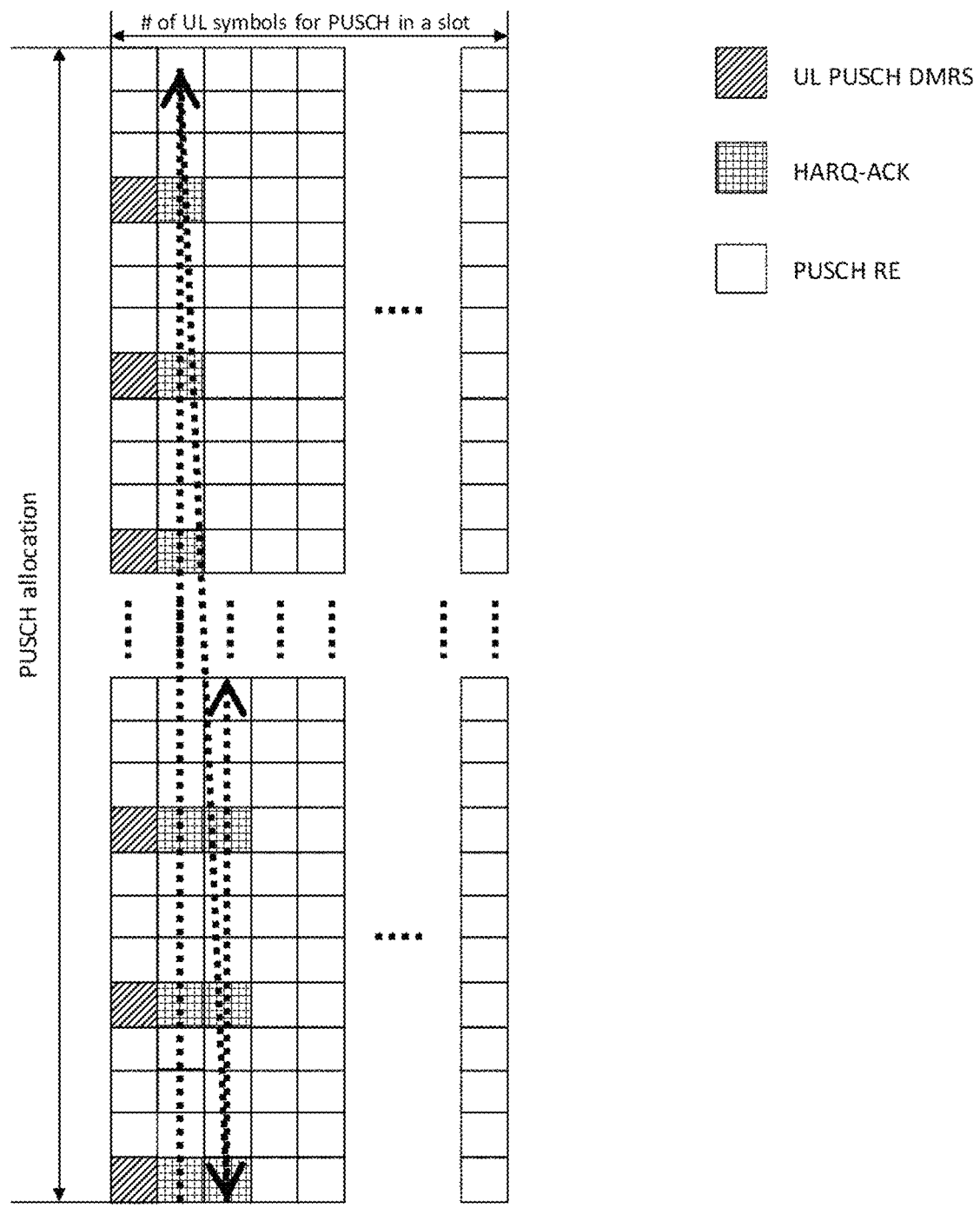
FIG. 21 illustrates HARQ-ACK information mapped onto a PUSCH resource according to another embodiment of the present disclosure.

FIG. 21 illustrates HARQ-ACK information mapped onto a PUSCH resource according to an embodiment of the present disclosure. Similar to FIG. 20, a DMRS for a PUSCH may be allocated to distributed REs on a symbol in the IFDMA scheme. ADMRS RE for the DMRS may be mapped to a resource spaced apart by a preset subcarrier interval on the same symbol. In this case, the UE may preferentially map the HARQ-ACK information to an RE corresponding to a subcarrier index of the DMRS RE among REs of a symbol following the DMRS symbol. In addition, the number of REs necessary for the HARQ-ACK information to be transmitted by the UE may exceed the number of DMRS REs. In this case, the UE may additionally map the HARQ-ACK information to an RE corresponding to a subcarrier index of the DMRS RE among REs of a symbol following a symbol to which a part of the HARQ-ACK information is preferentially mapped. Through this, the UE may additionally obtain a time diversity gain in comparison to the embodiment of FIG. 20 in HARQ-ACK information transmission in the PUSCH resource in the frequency domain.

Figure 22:
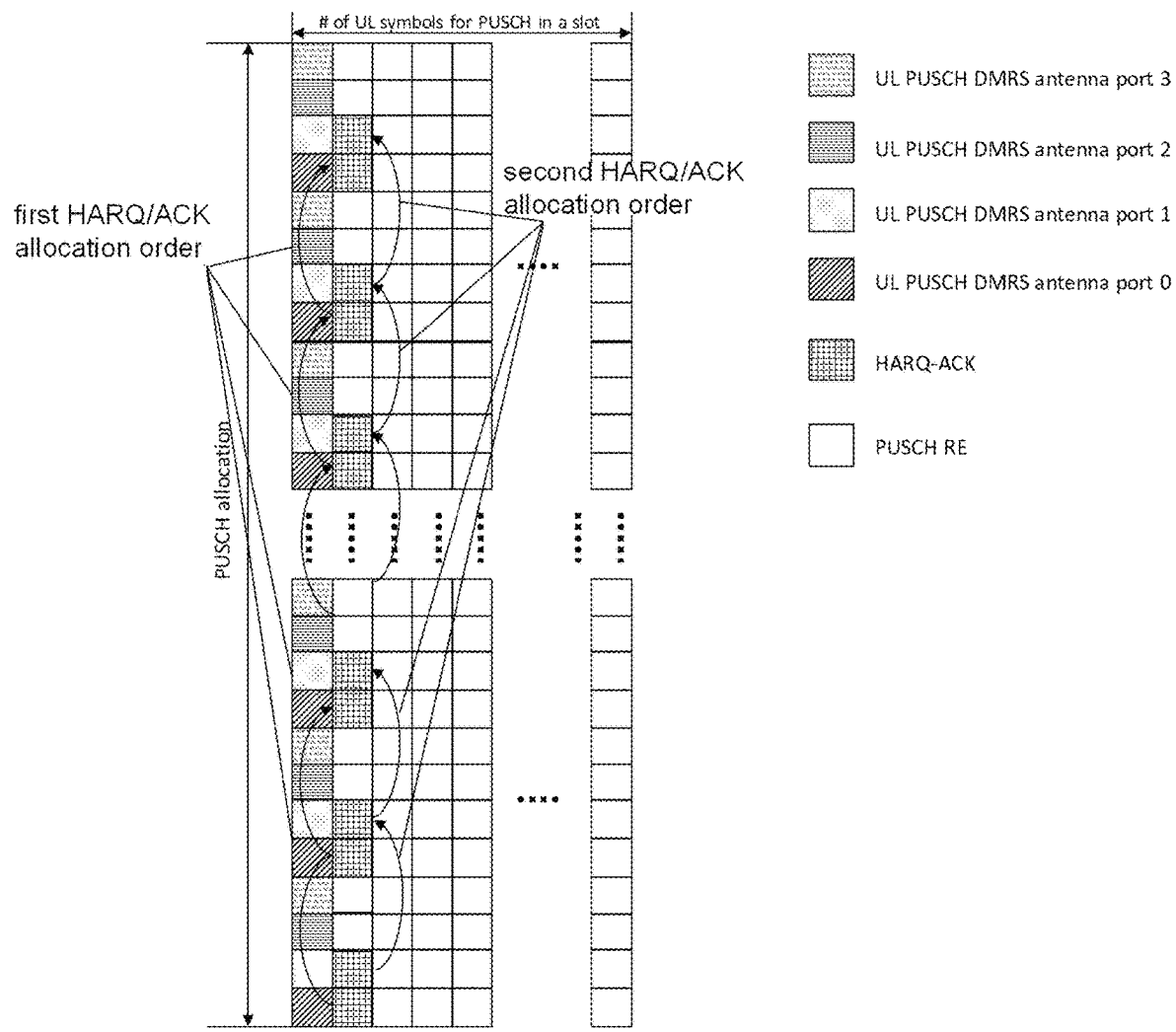
FIGS. 22 and 23 illustrate UCI mapped onto a PUSCH resource, when two or more antenna ports are allocated to a DMRS according to an embodiment of the present disclosure.
Figure 23:
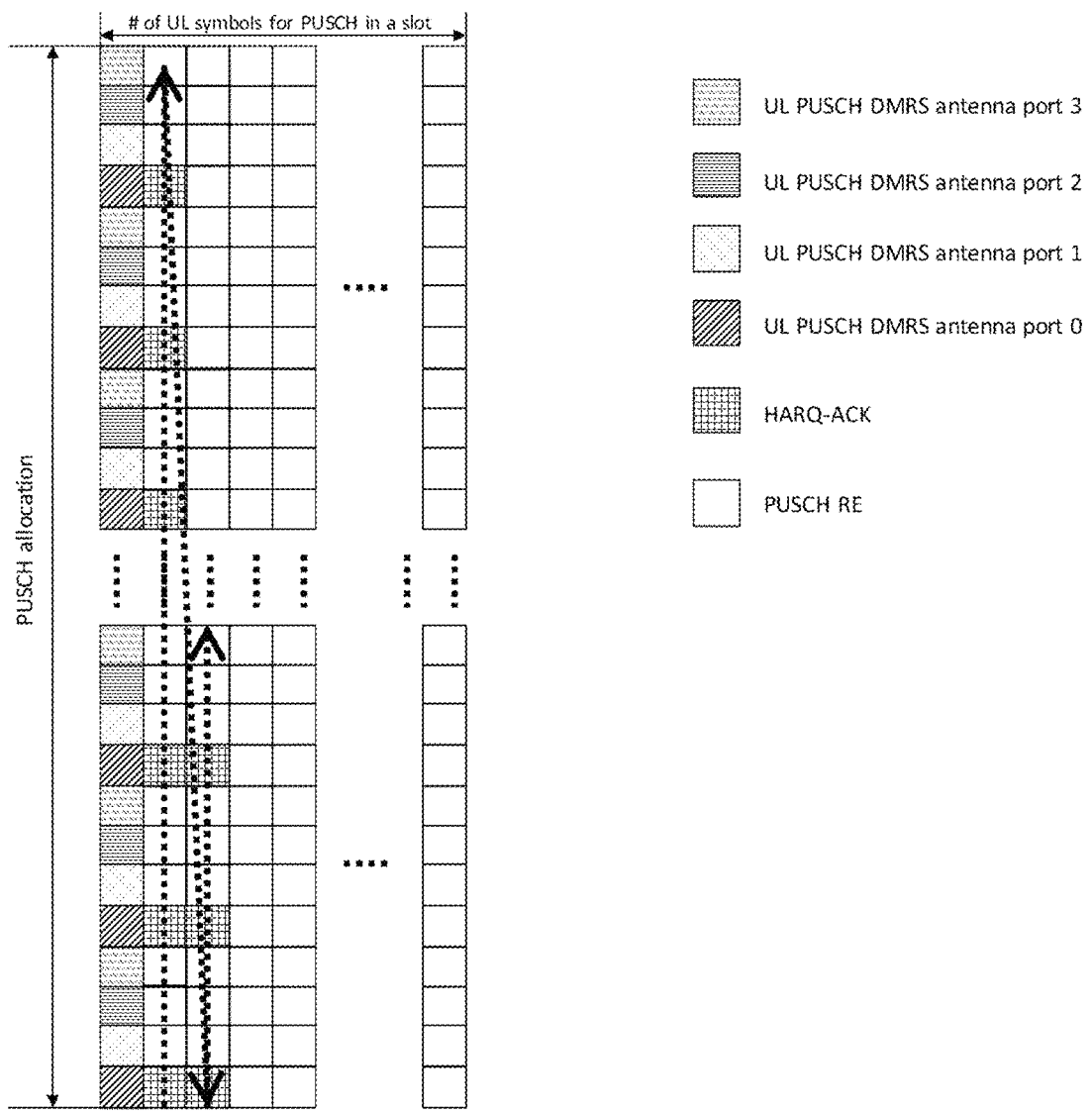

Meanwhile, according to an embodiment of the present disclosure, antenna ports of a DMRS for a PUSCH may be two or more. FIGS. 22 and 23 illustrate UCI mapped onto a PUSCH resource, when two or more antenna ports are allocated to the DMRS according to an embodiment of the present disclosure. The base station may allow the UE to form two or more DMRS antenna ports for the PUSCH. The UE may transmit the DMRS through multiple transmission layers using the two more antenna ports configured by the base station. In this case, the UE may map the UCI, which is transmitted through the PUSCH, to the PUSCH resource based on an RE allocated for the DMRS transmission for each antenna port. In addition, the configuration type of the RE for the DMRS may be changed according to a CP-OFDM and a DFT-S-OFDM that are waveforms used in an uplink. Accordingly, the UE may map the UCI to the PUSCH resource based on antenna port-related information and information about the waveform.

The UE using the DFT-S-OFDM waveform in the uplink may transmit a PUSCH-allocated frequency resource using a Zadoff-Chu sequence in a specific symbol(s) for the DMRS. Alternatively, the UE using the DFT-S-OFDM waveform in the uplink may transmit the DMRS based on a PUSCH DMRS structure in the IFDMA scheme. This is because another UE(s) using the CP-OFDM waveform may transmit the DMRS based on the PUSCH DMRS structure in the IFDMA scheme. In this case, the UE may map the UCI onto the PUSCH resource in the same method regardless of the waveform. First, according to an embodiment of the present disclosure, regardless of whether the waveform used in the uplink is the CP-OFDM waveform or DFT-S-OFDM waveform, a method for mapping the HARQ-ACK information onto the PUSCH resource will be described.

Referring to FIG. 22, the UE may preferentially map the HARQ-ACK information to a first antenna port (antenna port 0) configured as transmission on a first layer among the antenna ports of the DMRS. The UE preferentially map the HARQ-ACK information to an RE having the same subcarrier index as a subcarrier index of an RE corresponding to the first antenna port among REs of a symbol following the DMRS symbol. This is because the DFT-S-OFDM waveform is restricted to single stream transmission, and the CP-OFDM transmission may also be transmitted through a single stream when the SNR is low. In addition, the number of REs necessary for the HARQ-ACK information to be transmitted by the UE may exceed the number of DMRS REs corresponding to the first antenna port of the DMRS. In this case, the UE may additionally map the HARQ-ACK information to an RE adjacent to the preferentially mapped RE in the frequency domain among the REs of a symbol following the DMRS symbol. Here, the adjacent RE may be an RE corresponding to a subcarrier index continuous from the subcarrier index of the DMRS RE. This is because as it is closer to the location of the DMRS symbol, the higher the channel estimation performance. The UE may compensate for reduction in the channel estimation performance in a higher Doppler frequency environment in which the UE moves fast and thus a channel in a slot changes fast. In addition, in a wireless communication environment using an mmWave, the UE may transmit the HARQ-ACK information in the same symbol to obtain a beamforming gain for the HARQ-ACK information.

Referring to FIG. 23, the UE may preferentially map the HARQ-ACK information to the first antenna port (antenna port 0) configured as transmission on the first layer among the antenna ports of the DMRS. Similarly to FIG. 22, the number of REs necessary for the HARQ-ACK information to be transmitted by the UE may exceed the number of REs corresponding to the first antenna port of the DMRS. In this case, the UE may additionally map the HARQ-ACK information to an RE corresponding to the first antenna of the DMRS among REs of a symbol following a symbol to which a part of the HARQ-ACK information is preferentially mapped. Through this, the UE may additionally obtain a time diversity gain in comparison to the embodiment of FIG. 22 in HARQ-ACK information transmission in the PUSCH resource in the frequency domain.

Hereinafter, according to an embodiment of the present disclosure, puncturing and rate-matching for a PUSCH resource will be described when HARQ-ACK information is mapped onto a PUSCH resource to be transmitted. According to an embodiment, when configuring the UE to map the UCI onto the PUSCH resource allocated to the UE, the base station may configure the PUSCH resource onto which the UCI is mapped is always punctured. Alternatively, the base station and UE are allowed to turn on/off simultaneous transmission of a PUCCH and a PUSCH through an RRC signal, and thus the base station may recognize whether the UCI is transmitted through the PUSCH or the PUCCH. In this case, the PUSCH resource to which the UCI is mapped may be configured to be always rate-matched. Meanwhile, in case of DTX in which a PDCCH, as scheduling information from the base station, is not received by the UE, the base station may expect HARQ-ACK information to be transmitted and may perform rate-matching to decode a UL-SCH. Here, the UE may not be configured to transmit the HARQ-ACK information, when the PDCCH is not received. In this case, in decoding, by the base station, the UL-SCH transmitted through the PUSCH from the UE, a mismatch in rate-matching may occur between the base station and the UE.

In addition, when UCI is mapped to an RE on a PUSCH resource and is configured to be transmitted by the UE as in FIGS. 19 to 21, application of puncturing or rate-matching in the PUSCH resource may be changed for each UCI type. For example, for a PUSCH resource through which at least the HARQ-ACK information is transmitted, the base station may configure the UE to puncture the PUSCH resource. On the other hand, for a PUSCH resource through which UCI (at least one among a CQI, an RI, a PMI, and beam-related information) other than the HARQ-ACK information is transmitted, the base station may configure the UE to perform rate-matching on the PUSCH resource. When the DL transmission is lost, the UE may not transmit the HARQ-ACK information. On the contrary, the base station may expect to receive the HARQ-ACK information. Accordingly, when the PUSCH resource for transmitting the HARQ-ACK information is configured to be rate-matched and the DL transmission is lost, the base station may also fail to decode the UCI other than the HARQ-ACK information transmitted through the PUCCH. Unlike this, when the PUCCH includes only transmission of channel state reporting such as the CQI, RI, PMI or beam-related information, mismatch may not occur even when the PUSCH resource is rate-matched.

Hereinafter, a method in which an RI is mapped onto a PUSCH resource will be described according to an embodiment of the present disclosure. The RI may be mapped onto the PUSCH resource in association with a manner in which HARQ-ACK information is mapped onto the PUSCH resource, which is described through FIGS. 19 to 21. For example, on the PUSCH resource, the RI may be mapped to consecutive REs in the time domain or the frequency domain among REs to which the HARQ-ACK information is mapped. According to embodiment, in an allocated PUSCH resource, the RI may be sequentially mapped to from an RE of a symbol following a symbol including the last RE among REs to which the HARQ-ACK information is sequentially mapped. Here, the method in which the HARQ-ACK information is sequentially mapped may be the method described through FIG. 19, 20 or 21. In addition, the UE may map the HARQ-ACK information to the RE of the corresponding symbol in a method identical or corresponding to the method in which the HARQ-ACK information is sequentially mapped, which is described through FIG. 19, 20, or 21.

According to another embodiment, an RI may be sequentially mapped to from an RE adjacent to the last RE in the same symbol as that of the last RE among REs to which the HARQ-ACK information is sequentially mapped. In addition, the RI may also be mapped to from a symbol following a symbol to which the HARQ-ACK information is mapped. For example, when a symbol in which a DMRS is transmitted is a first symbol and a symbol in which the HARQ-ACK information is transmitted is a second symbol, the RI may be mapped to a third symbol. In addition, the RI may be mapped to an RE corresponding to a subcarrier index to which the DMRS is allocated among an RE(s) of the third symbol in a scheme similar to the mapping method of the HARQ-ACK information.

Hereinafter, a method in which beam-related information is mapped onto a PUSCH resource will be described according to an embodiment of the present disclosure. According to the embodiment, the beam-related information may be mapped onto a symbol other than the PUSCH resource to which the HARQ-ACK information and the RI are mapped. Here, the beam-related information may be mapped closest to the RE to which the DMRS is mapped in the UCI other than the HARQ-ACK information and the RI. In addition, among symbols on a UL slot, the beam-related information may be mapped to the most leading symbol except for the REs to which the HARQ-ACK information and the RI are mapped. The beam-related information is required for the base station and the UE to perform matching on each other for DL/UL beamforming, and thus is preferable to be transmitted in the front.

Hereinafter, a method in which channel state information such as the CQI/PMI is mapped onto a PUSCH resource will be described according to an embodiment of the present disclosure. According to an embodiment, the channel state information may be mapped onto a symbol to be transmitted following the HARQ-ACK information, the RI and the beam-related information in the PUSCH resource. This is because a beamforming direction may be different for each symbol in an mmWave system, and a sub-6 GHz system and a system using mmWave of 6 GHz or more do not adopt methods different from each other.

On the other hand, according to an embodiment of the present disclosure, the UE may indicate information representing whether the PUSCH resource is rate-matched in relation to transmission of the HARQ-ACK information mapped onto the PUSCH resource. As described above, in a situation in which the base station expects to receive the HARQ-ACK information from the UE, the UE may not transmit the HARQ-ACK information due to a DTX or the like. This is because, when a transmission resource is rate-matched, information mismatching may occur between the base station and the UE. Hereinafter, descriptions will be provided about a method for explicitly or implicitly indicating rate-matching related information that represents whether or not the UE rate-matches the PUSCH resource.

According to an embodiment, when the HARQ-ACK information is mapped onto the PUSCH resource and then transmitted, the UE may rate-match the PUSCH resource. For example, the UE may determine whether to perform rate-matching based on a PDCCH that schedules a PDSCH to be transmitted from the base station. In detail, when the HARQ-ACK information corresponding to the PDSCH is set to 3 bits or more, the UE may rate-match the PUSCH resource. In addition, when it is configured to perform rate-matching on the HARQ-ACK information corresponding to the PDSCH, the UE may rate-match the PUSCH resource. In this case, in order to prevent mismatching, the base station may perform decoding in a scheme that the UE assumes rate-matching for the PUSCH and in a scheme that rate-matching is not assumed to be performed. This may increase the complexity of the base station.

According to an embodiment, the UE may explicitly indicate rate-matching related information through L1 signaling. More specifically, the UE may indicate whether a UL-SCH is rate-matched on a corresponding PUSCH RE using a short PUCCH format on a slot (a UL slot or a UL-centric slot) through which a PUSCH intended to be transmitted is transmitted. When the rate-matching related information is transmitted using the short PUCCH format, the rate-matching related information may be set to be transmitted through a first symbol or first and second symbols in a slot set to be TDMed with the PUSCH. In addition, the rate-matching related information may be set to be transmitted using the short PUCCH format through a first symbol from the last symbol or the first and second symbols from the last symbol among symbols in the slot set to be TDMed with the PUSCH. The base station may decode a PUCCH having been transmitted from the UE to acquire the rate-matching related information. In addition, the base station may be configured to perform PUSCH decoding based on the rate-matching related information to ensure the PUSCH decoding performance.

According to another embodiment, the UE may implicitly indicate rate-matching related information. For example, when rate-matching a PUSCH resource in relation to transmission of HARQ-ACK information mapped onto the PUSCH resource according to a configuration by the base station, the UE may apply phase rotation and/or constellation rotation to other data on the PUSCH resource, or the UCI on the PUSCH resource, and then transmit the other data or the UCI. Alternatively, the UE may apply the phase rotation and/or the constellation rotation to a DMRS for PUSCH demodulation, and then transmit the DMRS. Alternatively, when using a DFT-S-OFDM waveform, the UE may be configured to transmit the DMRS using a sequence cyclic-shifted from a base sequence based on a CS value determined by a preset method. Here, the preset method may be a method for determining a CS value of a Zadoff-Chu sequence of the DMRS for demodulating the PUSCH allocated to the UE as a CS value having a farthest interval from a CS value indicated through DCI from the base station. Alternatively, the UE may be configured to apply the phase rotation and/or the constellation rotation to a subset including at least one among data, UCI or DMRS on the PUSCH resource, and then transmit the subset. When detecting the phase rotation and/or the constellation rotation for the subset including the at least one among data, UCI or DMRS on the PUSCH resource, the base station may determine that the rate-matching related information has received. For example, when detecting the phase rotation and/or the constellation rotation for the subset including the at least one among data, UCI or DMRS on the PUSCH resource, the base station may determine that the HARQ-ACK information-mapped PUSCH has been rate-matched and transmitted. In addition, the UE may change a preset scrambling sequence, which is applied to the subset including the at least one among data, UCI or DMRS on the PUSCH resource, to indicate the rate-matching related information.

A wireless communication system according to an embodiment of the present disclosure, in particular, a cellular wireless communication system provides a method for efficiently transmitting signals and a device therefor. In addition, a wireless communication system according to an embodiment of the present disclosure provides a wireless communication method for transmitting and receiving an uplink control channel and a device therefor.

The method and system of the present disclosure are described in relation to specific embodiments, configuration elements, a part of or the entirety of operations of the present disclosure may be implemented using a computer system having general purpose hardware architecture.

The aforementioned description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, these embodiments as described above are only proposed for illustrative purposes and do not limit the present disclosure. For example, each component described to be of a single type can be implemented in a distributed manner. Likewise, components described to be distributed can be implemented in a combined manner.

The scope of the present disclosure is presented by the accompanying Claims rather than the aforementioned description. It should be understood that all changes or modifications derived from the definitions and scopes of the Claims and their equivalents fall within the scope of the present disclosure.

The invention claimed is:

1. A User Equipment (UE) in a wireless communication system, the UE comprising:
a processor is configured to:
transmit uplink control information (UCI) which includes hybrid automatic repeat request acknowledgment (HARQ-ACK) information representing a response to a downlink channel having been received from a base station, a scheduling request (SR) representing whether to request for uplink resource allocation, and a beam recovery request (BR) representing whether to request for recovery for a beam failure,
when a number of bits of the UCI does not exceed 2, transmit the UCI using a physical uplink control channel (PUCCH) format 0 generated by cyclic-shifting a base sequence based on a second cyclic shift (CS) value, wherein a first CS value is determined based on the HARQ-ACK information, wherein a CS offset is determined based on request information representing a request to be transmitted from the UE to the base station, wherein determine the second CS value representing a degree of cyclic-shifting the base sequence to be used in a PUCCH based on the first CS value and the CS offset, wherein a transmission resource of the PUCCH format 0 is one resource block representing 12 subcarriers in a frequency domain,
when the number of bits of the UCI exceeds 2, transmit the UCI using a frequency using PUCCH format 2,
wherein when the number of bits of the UCI exceeds 2, the UCI includes one or more bits representing the HARQ-ACK information, one or more bits representing the SR, and one or more bits representing BR.

2. The UE of claim 1, wherein the second CS value is any one among a plurality of CS values determined according to the CS offset and a number of bits representing the HARQ-ACK information,
the plurality of CS values are configured with CS values that are different from each other and increase by an identical interval based on a smallest CS value among the plurality of CS values, and a size of the interval is constant regardless of whether the SR is the positive SR.

3. The UE of claim 2, wherein the base sequence is cyclic-shifted with N CS values which are different from each other, the HARQ-ACK information comprises m bits, and the size of the interval is N/(2^m).

4. The UE of claim 3, wherein m is 2, and N is 12.

5. The UE of claim 4, wherein when the SR is the positive SR, the CS offset is 1, and when the SR is not the positive SR, the CS offset is 0.

6. The UE of claim 5, wherein when the SR is not the positive SR, the second CS value is one among 0, 3, 6, and 9.

7. The UE of claim 6, wherein when the SR is the positive SR, the second CS value is one among 1, 4, 7, and 10.

8. The UE of claim 1, wherein each of the transmission resource of the PUCCH format 0 and transmission resource of the PUCCH format 2 are one or two symbols in a time domain.

9. The UE of claim 1, wherein a PUCCH resource for the SR and a PUCCH resource for the BR are independently configured.

10. The UE of claim 9, wherein the processor further configured to:

when the number of bits of the UCI does not exceed 2 and the BR is not a positive BR which request information on a beam, transmit the SR and the HARQ-ACK information through the PUCCH resource for the SR, and when the number of bits of the UCI does not exceed 2 and the BR is the positive BR, transmit the BR and the HARQ-ACK information through the PUCCH resource for the BR.

11. A method of wireless communication by a User Equipment (UE) operates in a wireless communication system, the wireless communication method comprising:

transmitting uplink control information (UCI) which includes hybrid automatic repeat request acknowledgment (HARQ-ACK) information representing a response to a downlink channel having been received from a base station, a scheduling request (SR) representing whether to request for uplink resource allocation, and a beam recovery request (BR) representing whether to request for recovery for a beam failure, when a number of bits of the UCI does not exceed 2, transmitting the UCI using a physical uplink control channel (PUCCH) format 0 generated by cyclic-shifting a base sequence based on a second CS value, wherein a first CS value is determined based on the HARQ-ACK information, wherein a CS offset is determined based on request information representing a request to be transmitted from the UE to the base station, wherein the second CS value representing a degree of cyclic-shifting the base sequence to be used in a PUCCH based on the first CS value and the CS offset, wherein a transmission resource of the PUCCH format 0 is one resource block representing 12 subcarriers in a frequency domain, and when the number of bits of the UCI exceeds 2, transmitting the UCI using a PUCCH format 2, wherein when the number of bits of the UCI exceeds 2, the UCI includes one or more bits representing the HARQ-ACK information, one or more bits representing the SR, and one or more bits representing BR.

12. The method of claim 11, wherein the second CS value is any one among a plurality of CS values determined according to the CS offset and a number of bits representing the HARQ-ACK information, the plurality of CS values are configured with CS values that are different from each other and increase by an identical interval based on a smallest CS value among the plurality of CS values, and a size of the interval is constant regardless of whether the SR is the positive SR.

13. The method of claim 12, wherein the base sequence is cyclic-shifted with N CS values which are different from each other, the HARQ-ACK information comprises m bits, and the size of the interval is N/(2^m).

14. The method of claim 13, wherein when the SR is a positive SR, the CS offset is 1, and when the SR is not the positive SR, the CS offset is 0.

15. The method of claim 14, wherein when the SR is not the positive SR, the second CS value is one among 0, 3, 6, and 9.

16. The method of claim 11, wherein a PUCCH resource for the SR and a PUCCH resource for the BR are independently configured.

17. The method of claim 16, wherein the transmitting the UCI using the PUCCH format 0 further comprises:

when the number of bits of the UCI does not exceed 2 and the BR is not a positive BR which requests a recovery for a beam failure, transmitting the SR and the HARQ-ACK information through the PUCCH resource for the SR, and when the number of bits of the UCI does not exceed 2 and the BR is the positive BR, transmitting the BR and the HARQ-ACK information through the PUCCH resource for the BR.

* * * * *